United States Patent
Findlay et al.

(10) Patent No.: US 10,339,690 B2
(45) Date of Patent: Jul. 2, 2019

(54) IMAGE RECOGNITION SCORING VISUALIZATION

(71) Applicants: Roland Findlay, San Jose, CA (US); Michael Griffin, Redwood City, CA (US); Tiffany Romain, Oakland, CA (US); Jamey Graham, Menlo Park, CA (US)

(72) Inventors: Roland Findlay, San Jose, CA (US); Michael Griffin, Redwood City, CA (US); Tiffany Romain, Oakland, CA (US); Jamey Graham, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 205 days.

(21) Appl. No.: 14/975,648

(22) Filed: Dec. 18, 2015

(65) Prior Publication Data

US 2017/0177195 A1  Jun. 22, 2017

(51) Int. Cl.
| | | |
|---|---|---|
| *G06F 3/048* | (2013.01) | |
| *G06T 13/80* | (2011.01) | |
| *G06T 11/60* | (2006.01) | |
| *G06Q 10/08* | (2012.01) | |
| *G06Q 30/06* | (2012.01) | |
| *G06K 9/00* | (2006.01) | |
| *G06K 9/22* | (2006.01) | |
| *G06K 9/20* | (2006.01) | |

(52) U.S. Cl.
CPC .......... *G06T 13/80* (2013.01); *G06K 9/00671* (2013.01); *G06K 9/22* (2013.01); *G06Q 10/087* (2013.01); *G06Q 30/0623* (2013.01); *G06T 11/60* (2013.01); *G06K 2009/2045* (2013.01); *G06T 2200/24* (2013.01)

(58) Field of Classification Search
CPC .......................... G06K 9/4671; G06Q 10/087
See application file for complete search history.

(56) References Cited

U.S. PATENT DOCUMENTS

| | | | |
|---|---|---|---|
| 7,953,299 B2 | 5/2011 | Shiiyama | |
| 8,922,667 B2* | 12/2014 | Oyama | H04N 5/23293 348/222.1 |
| 2002/0099542 A1* | 7/2002 | Mitchell | G06F 17/2241 704/231 |

(Continued)

FOREIGN PATENT DOCUMENTS

WO   WO2015086537   6/2015

OTHER PUBLICATIONS

Kwatra, Vivek et al.; "Graphcut Textures: Image and Video Synthesis Using Graph Cuts"; found at http://www.cc.gatech.edu/cpl/projects/graphcuttextures; dated 2003; 10 pages; GVU Center / College of Computing Georgia Institute of Technology.

(Continued)

*Primary Examiner* — Hua Lu
(74) *Attorney, Agent, or Firm* — Patent Law Works LLP

(57) ABSTRACT

A system and method for image processing result visualization. The method includes receiving a job, wherein the job includes a panoramic image and image recognition information, and creating a visualization based on the job, wherein the visualization includes the panoramic image with the image recognition information layered over the panoramic image.

20 Claims, 20 Drawing Sheets

(56) References Cited

U.S. PATENT DOCUMENTS

| | | | |
|---|---|---|---|
| 2003/0083850 A1 | 5/2003 | Schmidt et al. | |
| 2005/0256726 A1* | 11/2005 | Benson | G06Q 10/0637 |
| | | | 705/28 |
| 2006/0013463 A1 | 1/2006 | Ramsay et al. | |
| 2008/0089615 A1 | 4/2008 | Shiiyama | |
| 2008/0267481 A1* | 10/2008 | Nakamura | G06K 9/033 |
| | | | 382/131 |
| 2009/0059270 A1* | 3/2009 | Opalach | G06K 9/00 |
| | | | 358/1.15 |
| 2009/0192921 A1* | 7/2009 | Hicks | G06F 3/0312 |
| | | | 705/28 |
| 2010/0171826 A1* | 7/2010 | Hamilton | G06Q 30/06 |
| | | | 348/135 |
| 2010/0287053 A1* | 11/2010 | Ganong | G06K 9/00248 |
| | | | 705/14.66 |
| 2011/0011936 A1* | 1/2011 | Morandi | G06K 9/00 |
| | | | 235/454 |
| 2012/0243737 A1 | 9/2012 | Ogawa | |
| 2013/0051611 A1* | 2/2013 | Hicks | G06Q 10/0875 |
| | | | 382/103 |
| 2013/0127906 A1* | 5/2013 | Sugita | G06T 7/001 |
| | | | 345/633 |
| 2013/0207973 A1* | 8/2013 | Mattila | G06T 13/80 |
| | | | 345/420 |
| 2014/0003729 A1* | 1/2014 | Auclair | G06K 9/6292 |
| | | | 382/224 |
| 2014/0006229 A1* | 1/2014 | Birch | G06Q 10/087 |
| | | | 705/28 |
| 2014/0067574 A1* | 3/2014 | Miyakoshi | G06Q 20/208 |
| | | | 705/23 |
| 2014/0092241 A1* | 4/2014 | Brinkman | G06K 9/00671 |
| | | | 348/135 |
| 2014/0129354 A1* | 5/2014 | Soon-Shiong | G06Q 30/06 |
| | | | 705/16 |
| 2014/0176764 A1* | 6/2014 | Nakamura | G06K 9/00308 |
| | | | 348/231.99 |
| 2015/0088703 A1* | 3/2015 | Yan | G06F 3/147 |
| | | | 705/28 |
| 2015/0123973 A1* | 5/2015 | Larsen | G06T 15/04 |
| | | | 345/427 |
| 2015/0379366 A1* | 12/2015 | Nomura | G06Q 50/28 |
| | | | 382/203 |
| 2016/0027091 A1* | 1/2016 | McGrath | G06Q 30/0633 |
| | | | 705/26.8 |
| 2016/0155011 A1* | 6/2016 | Sulc | G06T 7/73 |
| | | | 382/103 |
| 2017/0255891 A1* | 9/2017 | Morate | G06T 7/11 |
| 2017/0300926 A1* | 10/2017 | Stout | G06Q 30/02 |
| 2018/0101724 A1* | 4/2018 | Fingado | G06K 9/00442 |
| 2018/0232946 A1* | 8/2018 | Jia | G06T 17/05 |

OTHER PUBLICATIONS

F. Pitie, et al.; "N-Dimensional Probability Density Function Transfer and its Application to Colour Transfer"; dated 2005; 6 pages; University of Dublin, trinity College Dublin 2, Ireland.

Matthew Brown and David G. Lowe "Automatic Panoramic Image Stitching Using Invariant Features"; dated Dec. 2006; 15 pages; International Journal of Computer Vision 74(1).

Francois Pitie, et al.; "Automated Colour Grading Using Colour Distribution Transfer"; dated 2007; 15 pages; Trinity College Dublin, 2 College Green, Dublin, Ireland.

F. Pitie, A. Kokaram "The Linear Monge-Kantorovitch Linear Colour Mapping for Example-Based Colour Transfer"; dated 2007; 9 pages; sigmedia.tv, Trinity College Dublin, Ireland.

Jorge Moraleda and Jonathan J. Hull; "Toward Massive Scalability in Image Matching"; dated 2010; 4 pages; 2010 International Conference on Pattern Recognition.

Mazin, Baptiste, et al. "Combining Color and Geometry for Local Image Matching" dated Nov. 11-15, 2012; 4 pages; 21st International Conference on Pattern Recognition (ICPR 2012), Tsukuba, Japan.

Nicolas Bonneel, et al. "Example-Based Video Color Grading" dated 2013; 11 pages.

Gormish, Michael; "Stitching Software for Ocutag Retail Execution (ORE)", dated Oct. 12, 2015; 15 pages.

Ramya Narasimha, et al. "Colour-Based Post-Processing of RVS Image Matching Results for ORE Product Disambiguation" dated Oct. 21, 2015, 18 pages.

* cited by examiner

IMAGE RECOGNITION SCORING VISUALIZATION

BACKGROUND

Field of the Invention

The specification generally relates to displaying processed information layered on a panoramic image. In particular, the specification relates to a system and method for generating a visualization of the panoramic image and layering the processed information relating to recognized products onto the panoramic image.

Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks and display stands is a labor-intensive effort, thereby making enforcement of planograms difficult. The location and quantity of products in retail stores can be manually tracked by a user.

Analyzing stock on shelves, racks and displays is made even more difficult when stock is present on a shelf, rack or display in the wrong location. Even with a detailed planogram, manual tracking might not catch those errors. Previous attempts at recognizing products using image processing have deficiencies. The large amounts of information being presented to a user can be overwhelming and might still not catch any stocking errors.

SUMMARY

The techniques introduced herein overcome the deficiencies and limitations of the prior art, at least in part, with a system and method for image recognition results visualization. In one embodiment, a system and method for visualization of image recognition results includes requesting a job related to a token and receiving the job related to the token, the job includes a panoramic image and metadata, processing the metadata to extract image recognition information and creating a visualization of the job. The visualization includes the panoramic image with the image recognition information layered over the panoramic image.

In another embodiment, a system and method for comparing visualization of image recognition results includes requesting a job and receiving the job, the job includes a series of panoramic images and image recognition information related to images in the series of panoramic images, creating a first visualization of an image in the series of panoramic images by layering the image recognition information over the image and presenting the first visualization in a timeline on a display.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
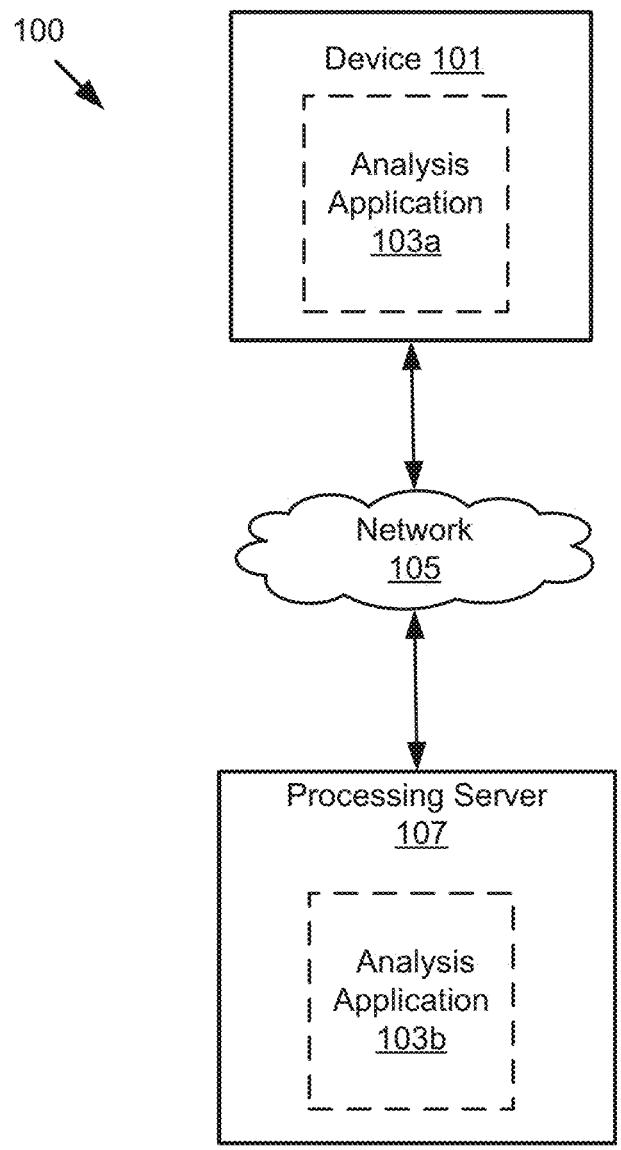
FIG. 1 is a high-level block diagram illustrating one embodiment of a system for displaying processed information on a panoramic image.

FIG. 1 is a high-level block diagram illustrating one embodiment of a system 100 for displaying processed information on a panoramic image. The illustrated system 100 may have a device 101 that can be accessed by a user and a processing server 107. The device 101 and/or the processing server 107 may include an analysis application 103. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the device 101 and the processing server 107, in practice one or more networks 105 can be connected to these entities.

In some embodiments, the system 100 includes a processing server 107 coupled to the network 105. In some embodiments, the processing server 107 may be either a hardware server, a software server, or a combination of software and hardware. The processing server 107 may be, or may be implemented by, a computing device including a processor, a memory, applications, a database, and network communication capabilities. In the example of FIG. 1, the components of the processing server 107 are configured to implement an analysis application 103b described in more detail below. In one embodiment, the processing server 107 provides services to a consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the processing server 107 sends and receives data to and from other entities of the system 100 via the network 105. For example, the processing server 107 sends and receives data including images to and from the device 101. The images received by the processing server 107 can include an image captured by the device 101, an image copied from a website or an email, or an image from any other source. Although only a single processing server 107 is shown in FIG. 1, it should be understood that there may be any number of recognition servers 101 or a server cluster. The processing server 107 also may include a data storage 243, which is described below in more detail with reference to FIG. 2.

The device 101 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The device 101 provides general graphics and multimedia processing for any type of application. The device 101 includes a display for viewing information provided by the processing server 107. While FIG. 1 illustrates a single device 101, the disclosure applies to a system architecture having one or more devices 101.

The device 101 is adapted to send and receive data to and from the processing server 107. For example, the device 101 sends a query image to the processing server 107 and the processing server 107 provides data in JSON (JavaScript Object Notation) format about one or more objects recognized in the query image to the device 101.

The analysis application 103 may include software and/or logic to provide the functionality for capturing a series of images to create a panoramic image and creating a visualization to overlay on the panoramic image. In some embodiments, the analysis application 103 can be implemented using programmable or specialized hardware, such as a field-programmable gate array (FPGA) or an application-specific integrated circuit (ASIC). In some embodiments, the analysis application 103 can be implemented using a combination of hardware and software. In other embodiments, the analysis application 103 may be stored and executed on a combination of the device 101 and/or the processing server 107, or by any one of the device 101 and/or processing server 107.

In some embodiments, the analysis application 103 acts as a thin-client application with some functionality executed on the device 101 by analysis application 103a and additional functionality executed on the processing server 107 by analysis application 103b. For example, the analysis application 103a on the device 101 could include software and/or logic for capturing the image, transmitting the image to the processing server 107, and displaying image recognition results with visualizations overlaid. A thin-client application 103b may include further functionality described herein with reference to analysis application 103, such as, processing the image and performing feature identification.

In some embodiments, the analysis application 103 receives an image of a portion of an object of interest from a capture device 245. The analysis application 103 determines features of the image. The analysis application 103 generates a user interface including a panoramic image of a series of images with features of the images highlighted in a visualization overlaid on the panoramic image a display of device 101. The operation of the analysis application 103 and the functions listed above are described below in more detail below.

Figure 2:
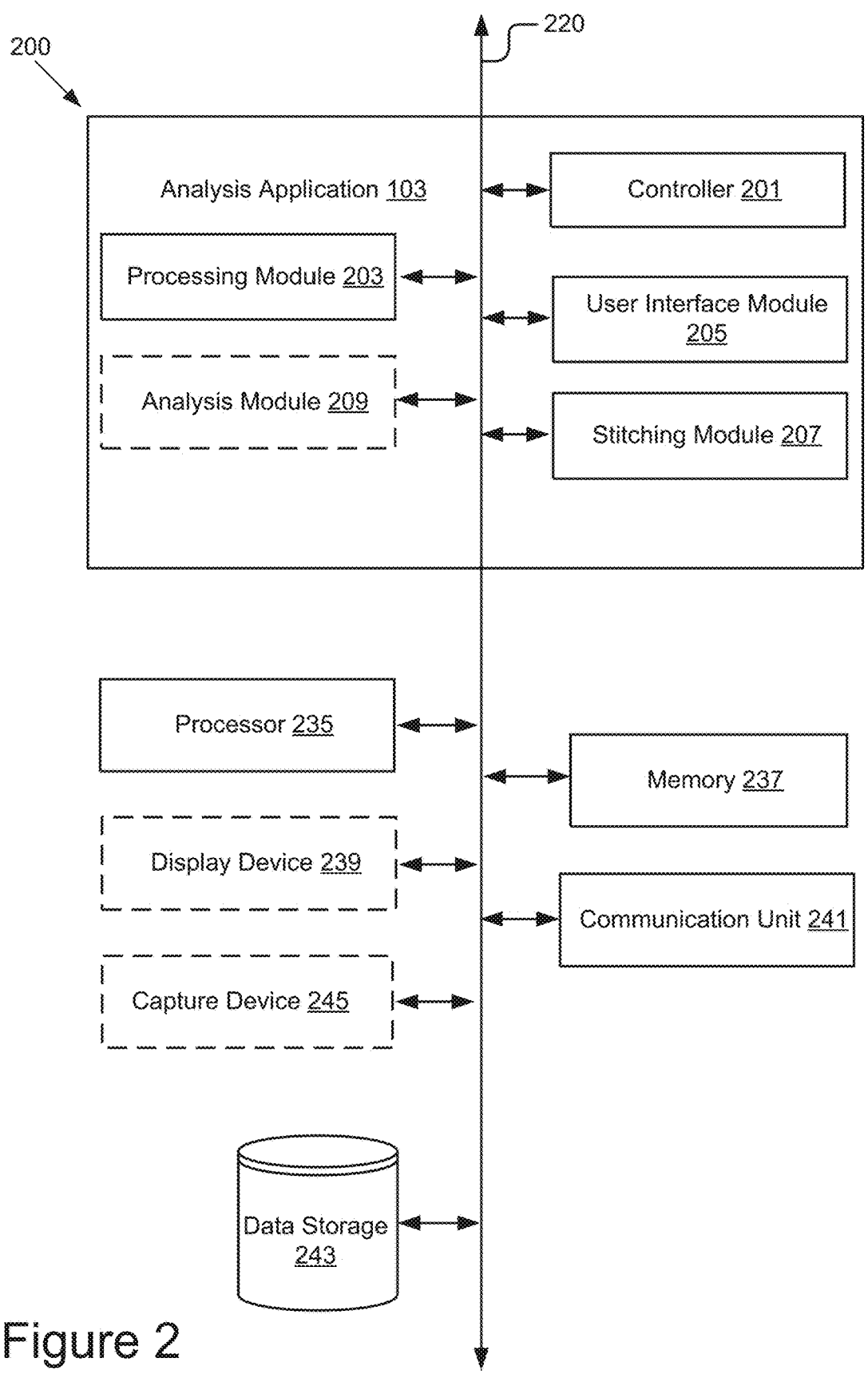
FIG. 2 is a block diagram illustrating one embodiment of a computing device including an analysis application.

FIG. 2 is a block diagram illustrating one embodiment of a computing device 200 including an analysis application 103. The computing device 200 may also include a processor 235, a memory 237, a communication unit 241, data storage 243, display device 239, a capture device 245, and an output device 249 according to some examples. The components of the computing device 200 are communicatively coupled by a bus or software communication mechanism 220. The bus or software communication mechanism 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the device 101, the processing server 107, or a combination of the device 101 and the processing server 107. In such embodiments where the computing device 200 is the device 101 and/or the processing server 107, it should be understood that the device 101, and the processing server 107 may include other components not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus or software communication mechanism 220 to access data and instructions therefrom and store data therein. The bus or software communication mechanism 220 may couple the processor 235 to the other components of the computing device 200 including, for example, the memory 237, the communication unit 241, the analysis application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the analysis application 103. The memory 237 is also capable of storing other instructions and data, including, for example, an operating system, hardware drivers, other software applications, databases, etc. The memory 237 may be coupled to the bus or software communication mechanism 220 for communication with the processor 235 and the other components of the computing device 200.

The memory 237 may include one or more non-transitory computer-usable (e.g., readable, writeable) device, a static random access memory (SRAM) device, a dynamic random access memory (DRAM), an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The communication unit 241 is hardware and/or software for receiving and transmitting data by linking the processor 235 to the network 105 and other processing systems. The communication unit 241 receives data such as requests from the device 101 and transmits the requests to the controller 201, for example a request to process an image. The communication unit 241 also transmits information including recognition results to the device 101 for display, for example, in response to processing the image. The communication unit 241 is coupled to the bus or software communication mechanism 220. In one embodiment, the communication unit 241 may include a port for direct physical connection to the device 101 or to another communication channel. For example, the communication unit 241 may include an RJ45 port or similar port for wired communication with the device 101. In another embodiment, the communication unit 241 may include a wireless transceiver (not shown) for exchanging data with the device 101 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus or software communication mechanism 220. The data storage 243 stores data for analyzing a received image and results of the analysis and other functionality as described herein. For example, the data storage 243 may store a captured image and the set of features determined for the captured image. Additionally, the data storage 243 may store a stitched linear panoramic image. Additionally, the data storage 243 may store image recognition results for the creating of a visualization. The data stored in the data storage 243 is described below in more detail.

In the illustrated embodiment, the display device 239 may be a screen for displaying a preview image or a user interface. The display device 239 may be configured to connect to the processor 235 and data storage 243 via the bus or software communication mechanism 220 and receive information from the analysis application 103. The display device 239 may be incorporated into a mobile phone, tablet, computer, camera, or other device capable of being configured with a display screen.

In the illustrated embodiment, the capture device 245 may be a device capable of capturing images of an object. The capture device 245 may be any device capable of capturing an image, including a camera, or similar device. The capture device 245 may be a stand-alone device or configured to be part of a device 101. The capture device 245 may be configured to connect to the processor 235 and data storage 243 via the bus or software communication mechanism 220 and receive and send information from the analysis application 103.

In some embodiments, the analysis application 103 may include a controller 201, a processing module 203, a user interface module 205, a stitching module 207, and an analysis module 209. The components of the analysis application 103 are communicatively coupled via the bus or software communication mechanism 220.

In some embodiments, the modules of the analysis application 103 can be implemented using programmable or specialized hardware including a field-programmable gate array (FPGA) or an application-specific integrated circuit (ASIC). In some embodiments, the modules can be implemented using a combination of hardware and software executable by the processor 235. In some implementations, the modules are stored in memory 237 and are accessible and executable by the processor 235.

The controller 201 may include software and/or logic to control the operation of the other components of the analysis application 103. The controller 201 controls the other components of the analysis application 103 to perform the methods described below with reference to FIGS. 3-6. The controller 201 may also include software and/or logic to provide the functionality for handling communications between the analysis application 103 and other components of the computing device 200 as well as between the components of the analysis application 103. In some implementations, the controller 201 is adapted for cooperation and communication with the processor 235, the memory 237 and other components of the analysis application 103 via the bus or software communication mechanism 220.

In some embodiments, the controller 201 sends and receives data, via the communication unit 241, to and from one or more of the device 101 and the processing server 107. For example, the controller 201 receives, via the communication unit 241, an image from a device 101 operated by a user and sends the image to the processing module 203, the stitching module 207, the analysis module 209, the user interface module 205, or the analysis module 209. In another example, the controller 201 receives image recognition information for creating a visualization from the processing module 209 and sends the data to the device 101, causing the device 101 to present the visualization to the user using the user interface module 205.

In some embodiments, the controller 201 receives data from other components of the analysis application 103 and stores the data in the data storage 243. For example, the controller 201 receives data including features identified for an image from the processing module 203 and stores the data in the data storage 243. In other embodiments, the controller 201 retrieves data from the data storage 243 and sends the data to other components of the analysis application 103. For example, the controller 201 retrieves data including a series of images from the data storage 243 and sends the data including the series of images to the stitching module 207 for stitching into a single panoramic image. In another example, the controller 201 retrieves data including a panoramic image from the data storage 243 and sends the data including the panoramic image to the processing module 203 for post processing. In another example, the controller 201 retrieves image recognition information form the data storage 243 and send the image recognition information to the analysis module 209 to extract information that is further sent to the user interface module 205 to create a visualization.

The processing module 203 may include software and/or logic to perform image recognition on an image. In some implementations, the processing module 203 is adapted for cooperation and communication with the processor 235, the memory 237 and other components of the analysis application 103 via the bus or software communication mechanism 220. In some embodiments the processing module 203 may be configured to receive an image related to a job and assign a token for that specific job. A job may be a series of images that may be stitched together to create a panoramic image. The processing module 203 may perform image recognition on the image related to the job to create metadata. The metadata may include image recognition information. The processing module 203 may assign the token related to the job to the image recognition information and store the image recognition information related to the job in the data storage 243. The image recognition information the processing module 203 creates may include a JSON string including sub-JSON structures. The sub-JSON structures may represent linear groupings. The linear groupings may be a collection of horizontal features in the image that the processing module 203 recognizes contain horizontal features of products. The sub-JSON structures may include facing structures. The facing structures may be a stack of products in a region of a shelf. The sub-JSON structure may include a list of recognized products and their location and rectangle size, as well as a product indicator that may be graphical displayed around the boundary of the recognized product.

The stitching module 207 may include software and/or logic to provide the functionality for receiving a series of images to stitch a single linear panoramic image. In some implementations, the stitching module 207 is stored in the memory 237 and is accessible and executable by the processor 235. In some implementations, the stitching module 207 is adapted for cooperation and communication with the processor 235, the memory 237 and other components of the analysis application 103 via the bus or software communication mechanism 220. In some embodiments, the stitching module 207 may be configured to receive or request an image that includes a token related to a job from the processing module 203. The stitching module 207 may use the token to retrieve a series of images from the data storage 243 related to the job and including the same token. The stitching module 207 may stitch together the received image and the retrieved images that include the same token and are related to the same job. The resulting stitched image created by the stitching module 207 is a linear panoramic image that relates to a job and is assigned the same token as the individual images related to the job that the linear panoramic image is made up of. The linear panoramic image is stitched together by the stitching module 207 to display a full set of shelves. The full set of shelves in some embodiments may be too large for a capture device 245 to capture in a single image, therefore a series of images of a product shelf may be captured and stitched together by the stitching module 207 to create a linear panoramic image of the product shelf.

The analysis module 209 may include software and/or logic to provide the functionality for performing extracting relevant information from the image recognition information. In some implementations, the analysis module 209 is adapted for cooperation and communication with the processor 235, the memory 237 and other components of the analysis application 103 via the bus or software communication mechanism 220. In some embodiments the analysis module 209 receives image recognition information in the form of metadata related to a job. The image recognition information in the form of metadata includes a token specific to the job. The analysis module 209 may extract from the metadata information that the user interface module 205 may use to create a visualization. In some embodiments, the analysis module 209 may receive image recognition information in the form of metadata that includes a JSON string of image recognition information. The analysis module 209 may extract from the information from the JSON string related to linear groupings, facings structures, recognized products, and product indicators related to the recognized products. In some implementations, the JSON string may also include a URL representing the final stitched panoramic image created by the stitching module 207 that the analysis module 209 may use for the user interface module 205 to use in retrieving a stitched panoramic image related to a job. In some embodiments, the functions of the analysis module 209 may be incorporated into the processing module 203, while in other embodiments, the functions of the analysis module 209 may be incorporated into the user interface module 205.

The user interface module 205 may include software and/or logic for creating a visualization and providing user interfaces displaying the visualization to a user. In some implementations, the user interface module 205 is adapted for cooperation and communication with the processor 235, the memory 237 and other components of the analysis application 103 via the bus or software communication mechanism 220. In some embodiments, the user interface module 205 receives instructions from a device 101 to display a visualization of a job. The user interface module 205 requests the job from data storage 243 using a token related to the job. The user interface module 205 receives the job related to the token from the data storage 243, wherein the job includes a stitched panoramic image created by the stitching module 207 and image recognition information in the form of metadata created by the processing module 203. The user interface module 205 may send the metadata including the image recognition information to the analysis module 209 for the analysis module to extract information related to the image recognition information. The user interface module 205 may receive the extracted information from the analysis module 209 and may create a visualization of the job by mapping or overlaying the extracted image recognition information over the stitched panoramic image. In alternative embodiments, the user interface module 205 may receive preprocessed jobs that may have been previously analyzed. In some embodiments, the user interface module 205 may include in the visualization, product indicators layered over recognized products displayed in the panoramic image. The user interface module 205 may further display a recognized product list and allow a user to interact with the recognized product list and score a recognized product highlighted by a product indicator and displayed in the visualization, as discussed more fully with reference to FIGS. 5, 9, 10, and 11.

In some embodiments, the user interface module 205 receives instructions from the controller 201 or other modules of the analysis application 103 to generate a graphical user interface that displays a visualization that includes a stitched panoramic image with image recognition information mapped or layered upon the stitched panoramic image. In such an embodiment, the user interface module 205 receives the stitched panoramic image, related to a job and assigned a specific token, directly from the stitching module 207. The user interface module 205 may also receive the metadata including image recognition information, related to a job and assigned a specific token, directly from the processing module 203.

In some embodiments, the user interface module 205 receives instructions from the controller 201 or other modules of the analysis application 103 to generate a graphical user interface that compares two visualizations and highlights recognized products in the visualizations. In other embodiments, the user interface module 205 sends graphical user interface data to an application (e.g., a browser) in the device 101 via the communication unit 241 causing the application to display the graphical user interface data as a graphical user interface.

Figure 3:
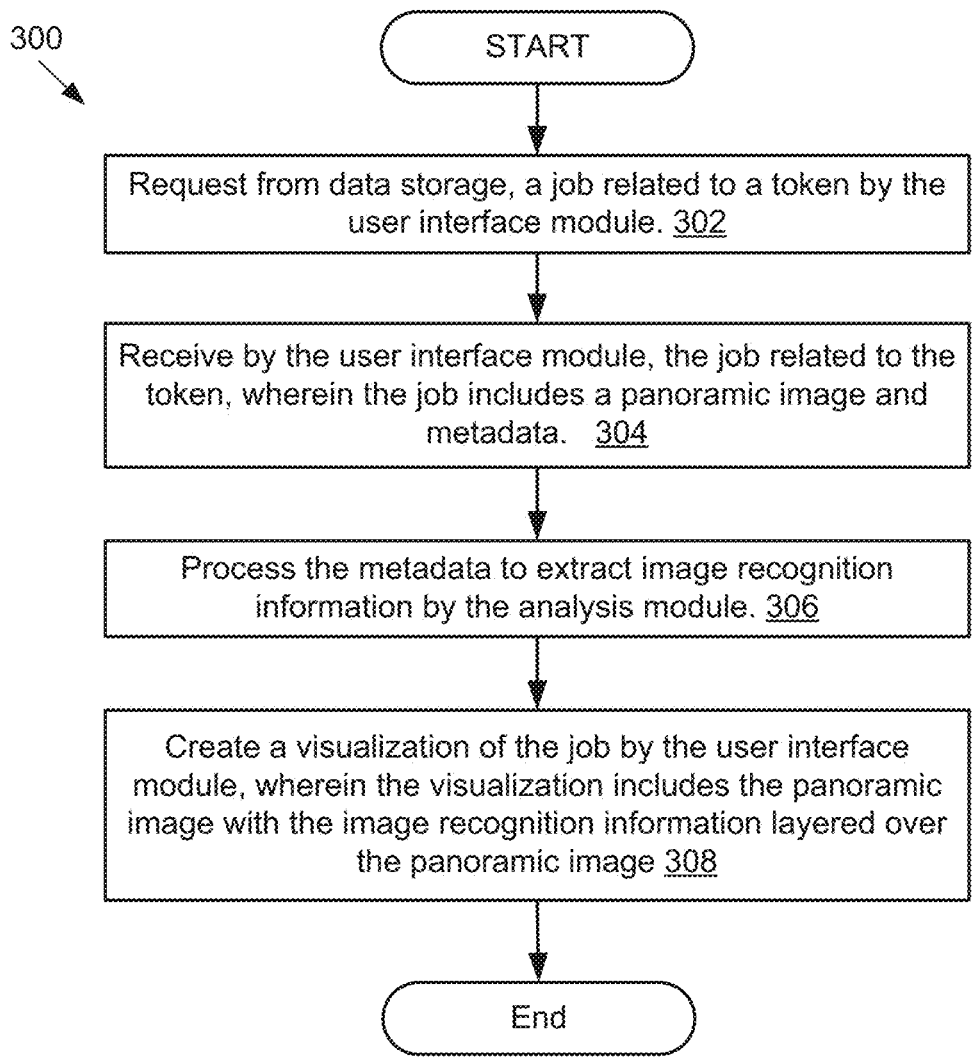
FIG. 3 is a flow diagram illustrating one embodiment of a method for creating a visualization.

FIG. 3 is a flow diagram 300 illustrating one embodiment of a method for creating a visualization. At 302, user interface module 205 requests a job related to a token. The token is related to previously processed information related to a job. For example, a token may be generated and assigned to a series of images related to a job, when a processing module 203 receives an image in a series of images for processing. The token may be assigned to all of the images in the series of images that are in turn stitched together into a single linear panoramic image by the stitching module 207. The token may be any type of label or key designed to assist in the lookup of images and metadata attached to the images. Each job receives a different token, to assist in identifying different series of images and metadata. At 304, the user interface module 205 receives the job related to the token, wherein the job includes a panoramic image and metadata. For example, the panoramic image is a single linear panoramic image stitched together by stitching module 207. The metadata included in the job may include any data related to the images in the series of images from the processing module 203.

In some embodiments, the metadata may be a JSON string representing the recognition performed by the processing module 203. The JSON string may include a sub-JSON structure representing recognized linear groupings in the panoramic image. The sub-JSON structure may also include recognized facing structures in the panoramic image. The sub-JSON structure may also include a list of recognized products, their locations, and product indicators. The JSON string may also include a URL representing the final stitched image.

At 306, the analysis module 209 processes the metadata to extract image recognition information. For example, the image recognition information may include the recognized linear groupings, individual facing structures, a list of recognized products and their locations, product indicators for each recognized product, or a URL representing the final stitched image. At 308, the user interface module 205 creates a visualization of the job, including the panoramic image and the image recognition information layered or mapped over the panoramic image. For example, the panoramic image may be a stitched image of a series of images of product shelves. The image recognition information may include recognized products and the recognized products may be highlighted by product indicators. The product indicators may be layered over the panoramic image by the user interface module 205 highlighting for display the recognized products.

Figure 4:
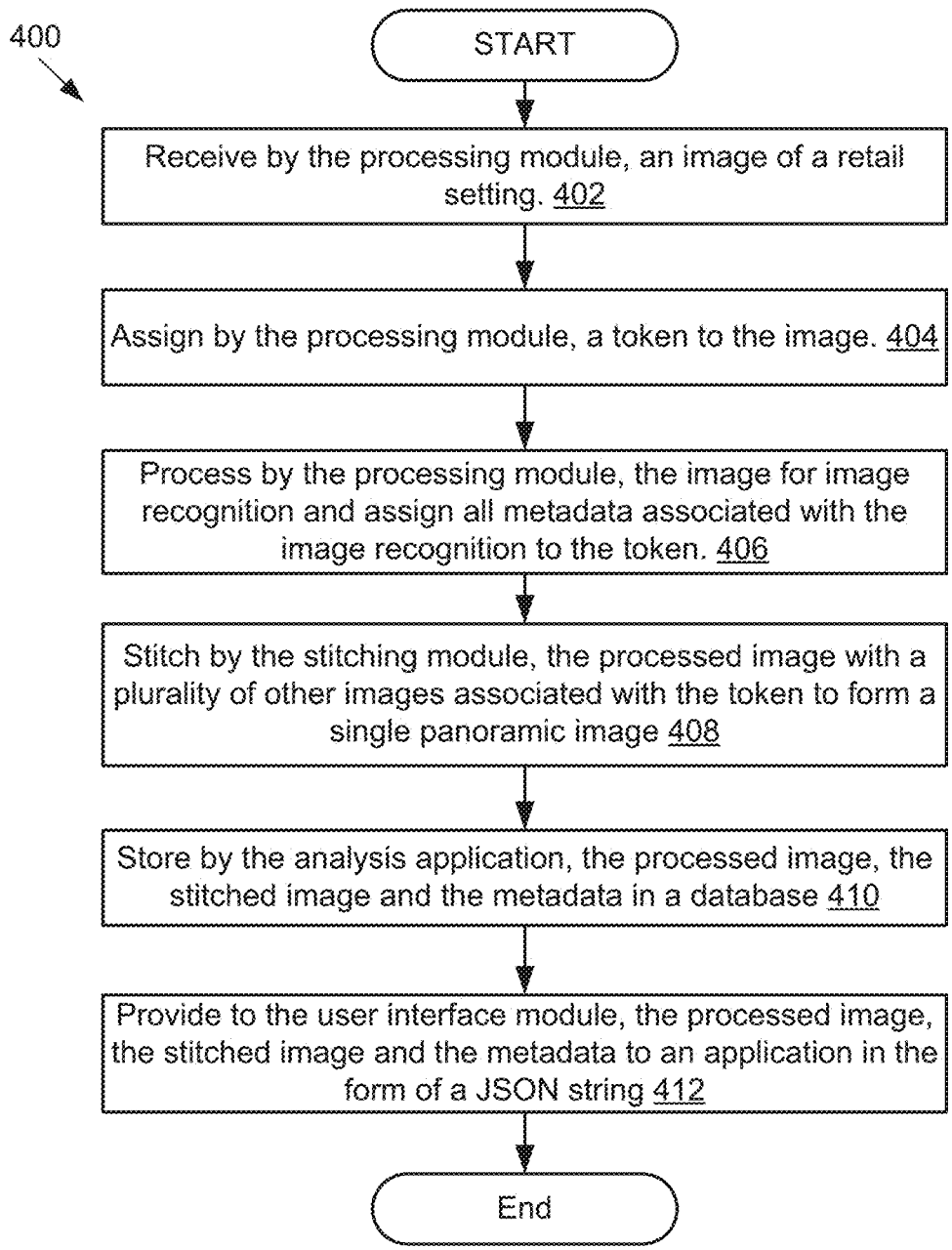
FIG. 4 is a flow diagram illustrating another embodiment of the method for creating a visualization.

FIG. 4 is a flow diagram 400 illustrating another embodiment of a method for creating a visualization. At 402, the processing module 203 receives an image of a retail setting. At 404, the processing module 203 assigns a token to the image. At 406, the processing module 203 processes the image for image recognition and assigns the metadata associated with the image recognition to the token. At 408, the stitching module 205 stitches the processed image with a plurality of other images associated with the token to form a single panoramic image. At 410, the analysis application 103 stores the processed image, the stitched image, and the metadata in a database. At 412, the analysis application 103 provides to the user interface module 205 the processed image, the stitched image, and the metadata to an application in the form of a JSON string.

Figure 5:
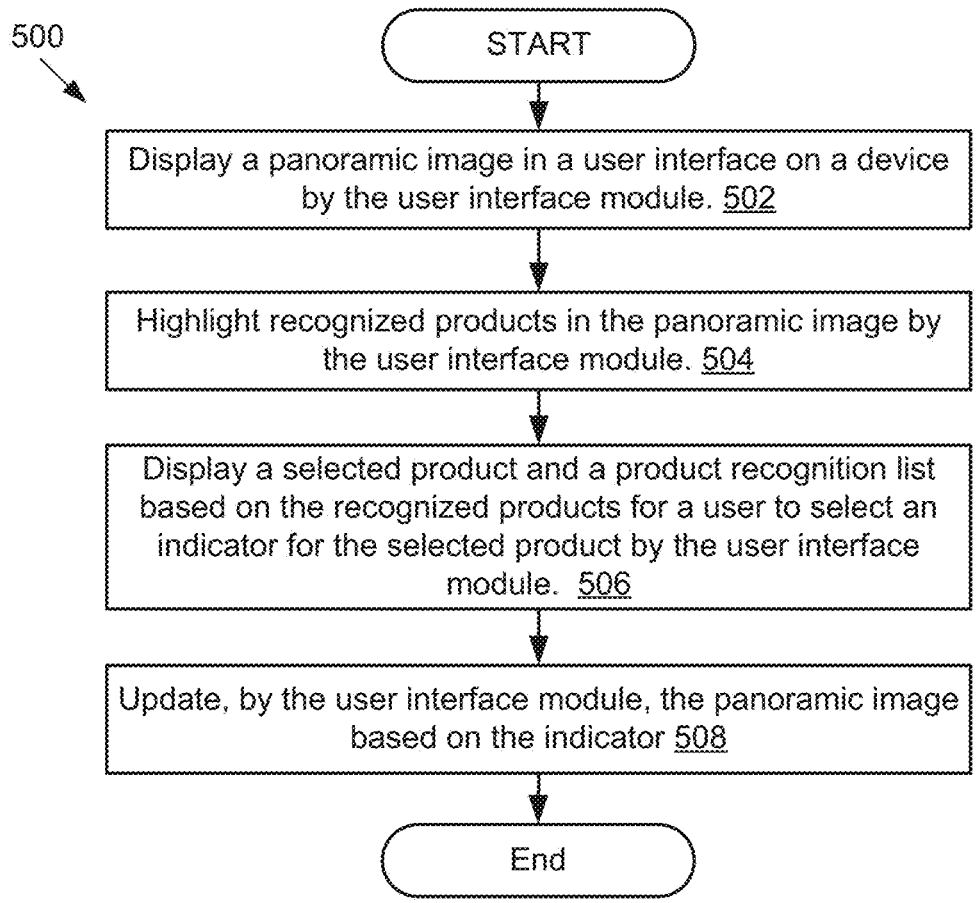
FIG. 5 is a flow diagram illustrating yet another embodiment of the method for creating a visualization.

FIG. 5 is a flow diagram 500 illustrating yet another embodiment of a method of a method for creating a visualization. At 502, the user interface module 205 displays a panoramic image in a user interface on device 101 as shown and discussed with reference to FIG. 8. At 504, the user interface module 205 highlights recognized products in the panoramic image using information extracted by the analysis module 209 as shown and discussed with reference to FIG. 9. In some embodiments, the user interface module 205 may also highlight linear groupings, individual facing structures, or other features of interest in the panoramic image. At 506, the user interface module 205 displays a selected product and a product recognition list based on the recognized product for a user to select an indicator for the selected product as shown and discussed with reference to FIG. 10. At 508, the user interface module 205 updates the panoramic image based on the indicator as shown and discussed with reference to FIG. 11.

Figure 6:
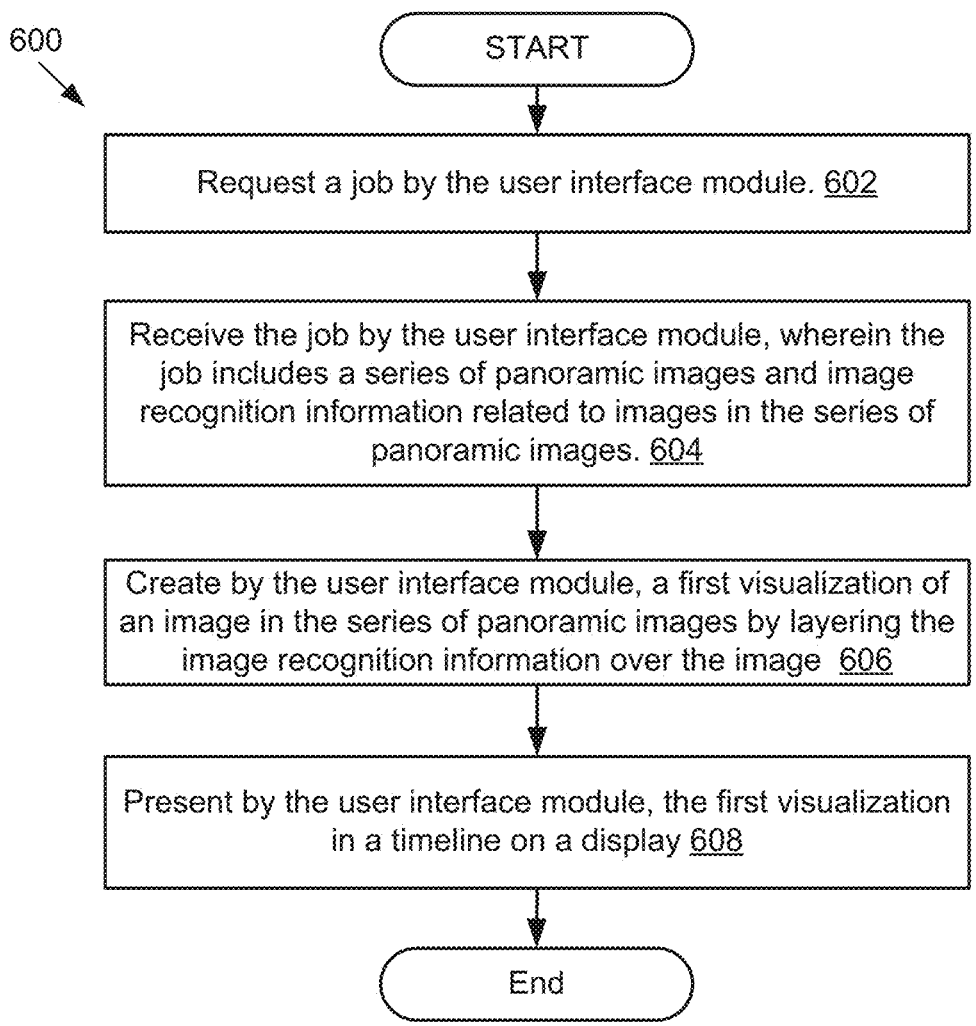
FIG. 6 is a flow diagram illustrating one embodiment of a method for presenting a visualization on a timeline.

FIG. 6 is a flow diagram 600 illustrating an embodiment for presenting a visualization in a timeline. At 602, the user interface module 205 requests a job. At 604, the user interface module 205 receives the job, wherein the job includes a series of panoramic images and image recognition information related to images in the series of panoramic images. At 606, the user interface module 205 creates a first visualization of an image in the series of panoramic images by layering the image recognition information over the image. At 608, the user interface module 205 presents the first visualization in a timeline on a display, as shown and discussed with reference to FIG. 13.

Figure 7:
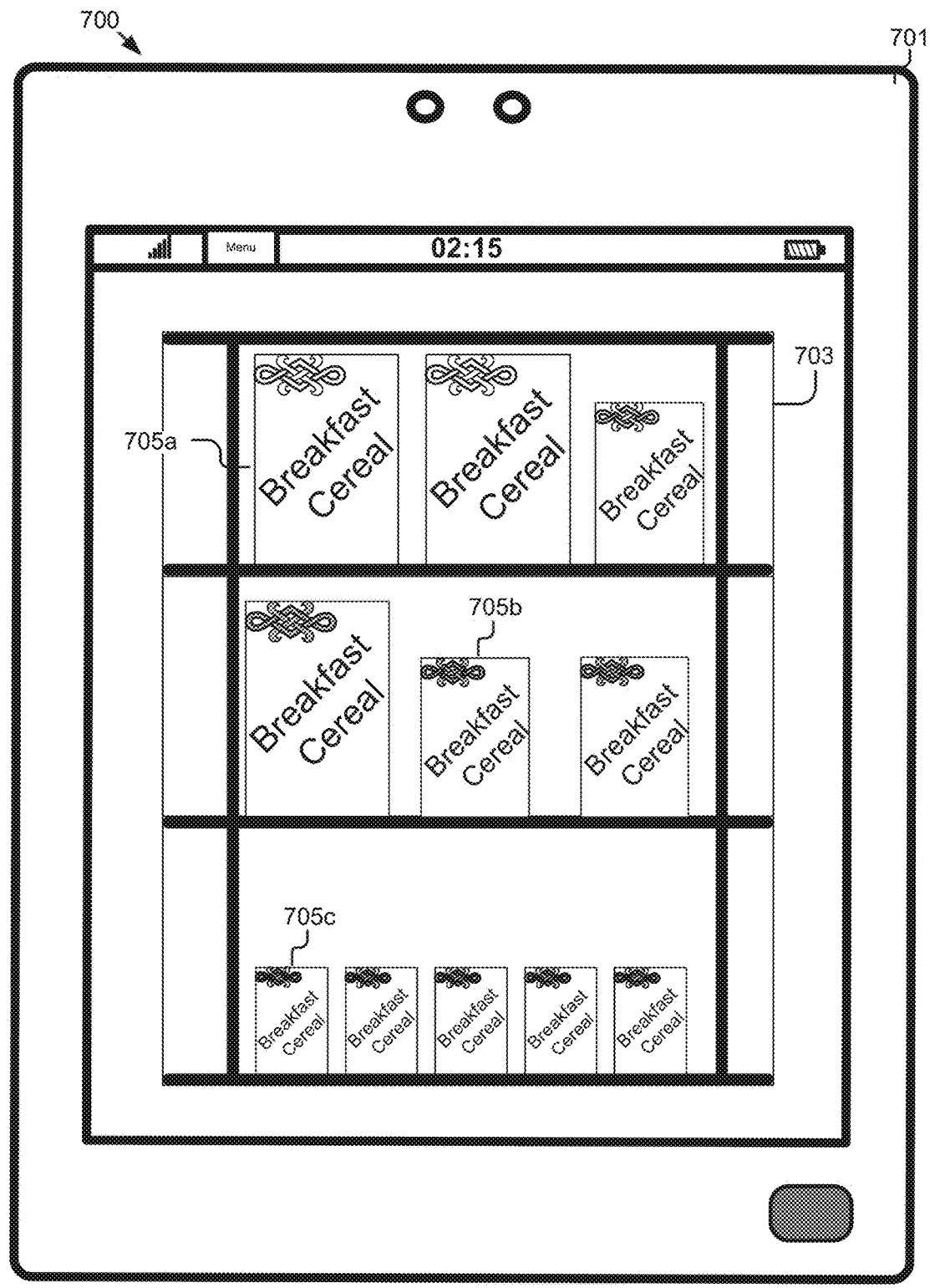
FIG. 7 is a graphical representation a device capturing an image.

As shown in FIG. 7, the FIG. 700 illustrates an example for capturing an image of a shelf 703. A user may use the device 701, in some embodiments device 701 may be device 101 or another device capable of capturing an image, to capture the image of the shelf 703. The shelf 703 may include products 705 representing different products on the shelf 703. For example, 705a displays a breakfast cereal product, 705b displays a different breakfast cereal product, and 705c displays a third breakfast cereal product. The shelf 703, may be any shelf that may hold a product, or the shelf may be replaced by a region, an artwork, a landmark, a scenic location, outer space, etc.

In some embodiments, the user interface module 205 receives a request from a user of the device 101 to capture an image of an object of interest. For example, the image can be an image of a shelf, a region, an artwork, a landmark, a scenic location, outer space, etc. The device 101 captures an image and provides it to the processing module 203. The analysis application 103 may instruct the user interface module 205 to generate a user interface for guiding a user in capturing the image using the device 101. The image of the shelf may be received for recognition. For example, the image can be an image of packaged products on a shelf (e.g., coffee packages, breakfast cereal boxes, soda bottles, etc.) in a retail store. The packaged product may include textual and pictorial information printed on its surface that distinguishes it from other items on the shelf. In one example, the user interface module 205 may cause the display of the device 101 to flash to indicate that the image was captured in response to the user tapping the screen. In some embodiments, the processing module 203 identifies a set of features from the image and a relative location to a point in the image (e.g., the location of one identified feature) where each feature occurs. In some embodiments, the device 101 stores the captured image and the set of identified features in a cache. In other embodiments, the device 101 sends the captured image to the processing server 107.

For purposes of creating a linear panoramic image using a series of images, the user may move the device 101 in any direction while remaining parallel to the shelving unit for capturing subsequent images following a first image. For example, the device 101 can move in a north, south, east, or west direction while remaining parallel to the shelving unit for capturing other images in the series. In some embodiments, the user interface module 205 receives a user selection of a pattern of image capture for capturing the series of images. The analysis application 103 instructs the user interface module 205 to provide guidance to the user via the device 101 on how to capture a next image in the series of images based on the selected pattern of image capture. The images in the series of images may then be stitched together into a linear panoramic image by the stitching module 207.

Figure 8:
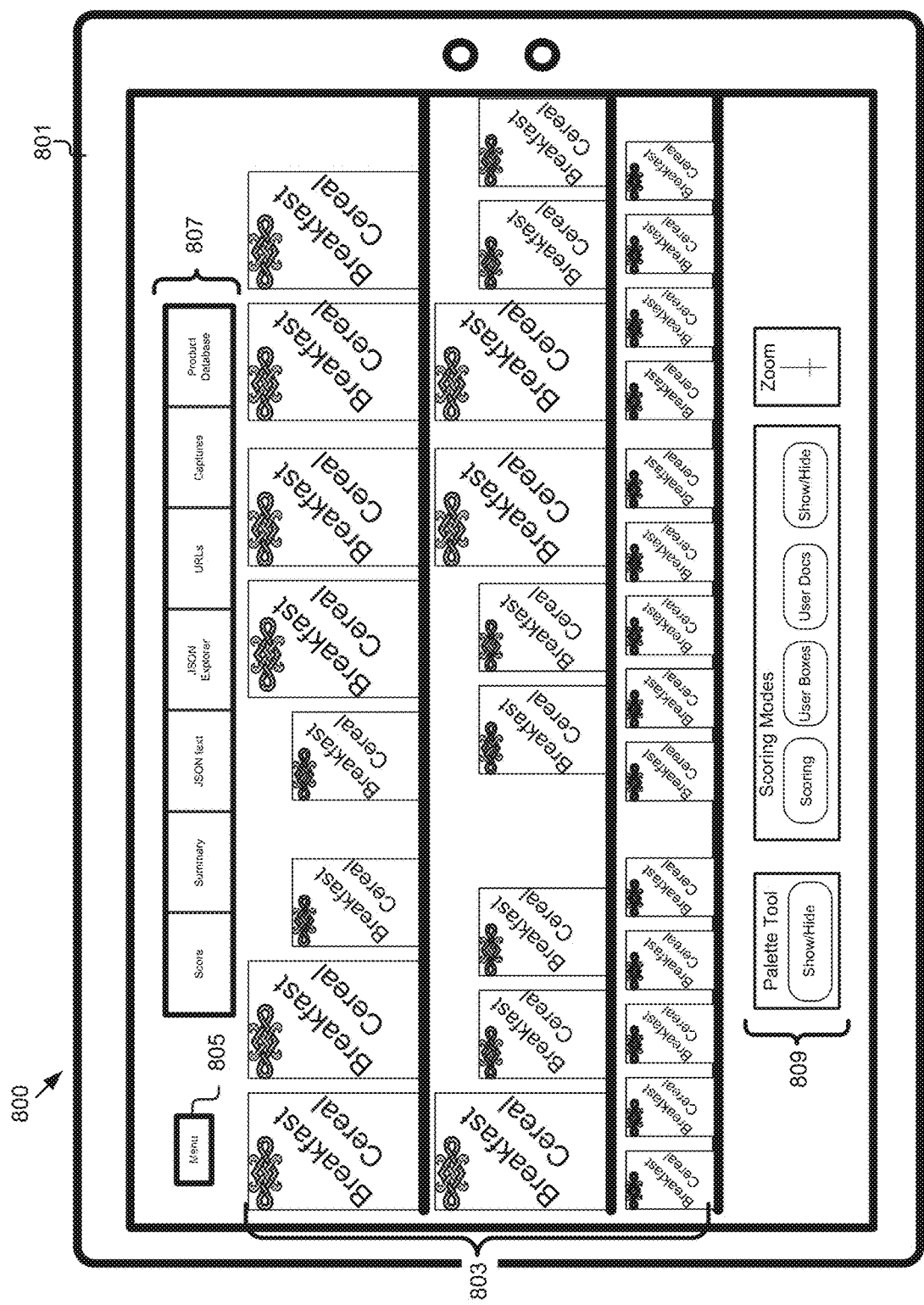
FIG. 8 is a graphical representation of an embodiment of a user interface displaying a panoramic image.

FIG. 8 is a graphical representation of an embodiment of a user interface, created by the user interface module 205, displaying a panoramic image. A display device 801 displays an image of an example user interface for viewing a stitched panoramic image 803 and provides tools for interacting with the stitched panoramic image 803. The display device 801 may be a device 101 or may be another device configured to display visualizations from an analysis application 103. A menu tool 805 may be included in the user interface and provide a user access to common menu functions, such as saving a job, printing a job, sharing a job, opening a new job, closing a job or any other common menu functions.

A tab bar 807 may be included in the user interface and provide a user access to a series of tabs controlling different views in the user interface. The different views provided by the tab bar 807 may include a score view showing a score for a recognized product in the user interface. The tab bar 807 may include a summary view showing a summary of a job. The tab bar 807 may include a JSON text view allowing a user to view the text of a JSON string related to a job. The tab bar 807 may include a JSON explorer for viewing the JSON data structure. The tab bar 807 may include a URLs tab that shows the URLs of different images. The tab bar 807 may include a tab showing captures of different images included in a job. The tab bar 807 may include a product database tab showing a database of products.

A control bar 809 may be included in the user interface for manipulating the stitched panoramic image 803. The control bar 809 may include zoom controls for viewing the stitched panoramic image 803 or any visualization data at a longer perspective view or a closer view as manipulated by a user. The control bar 809 may include scores modes for displaying different modes of scoring boxes for viewing a visualization as will be further discussed in FIG. 9. The control bar 809 may include a palette tool for viewing the display on the user interface in different colors as manipulated by a user.

Figure 9:
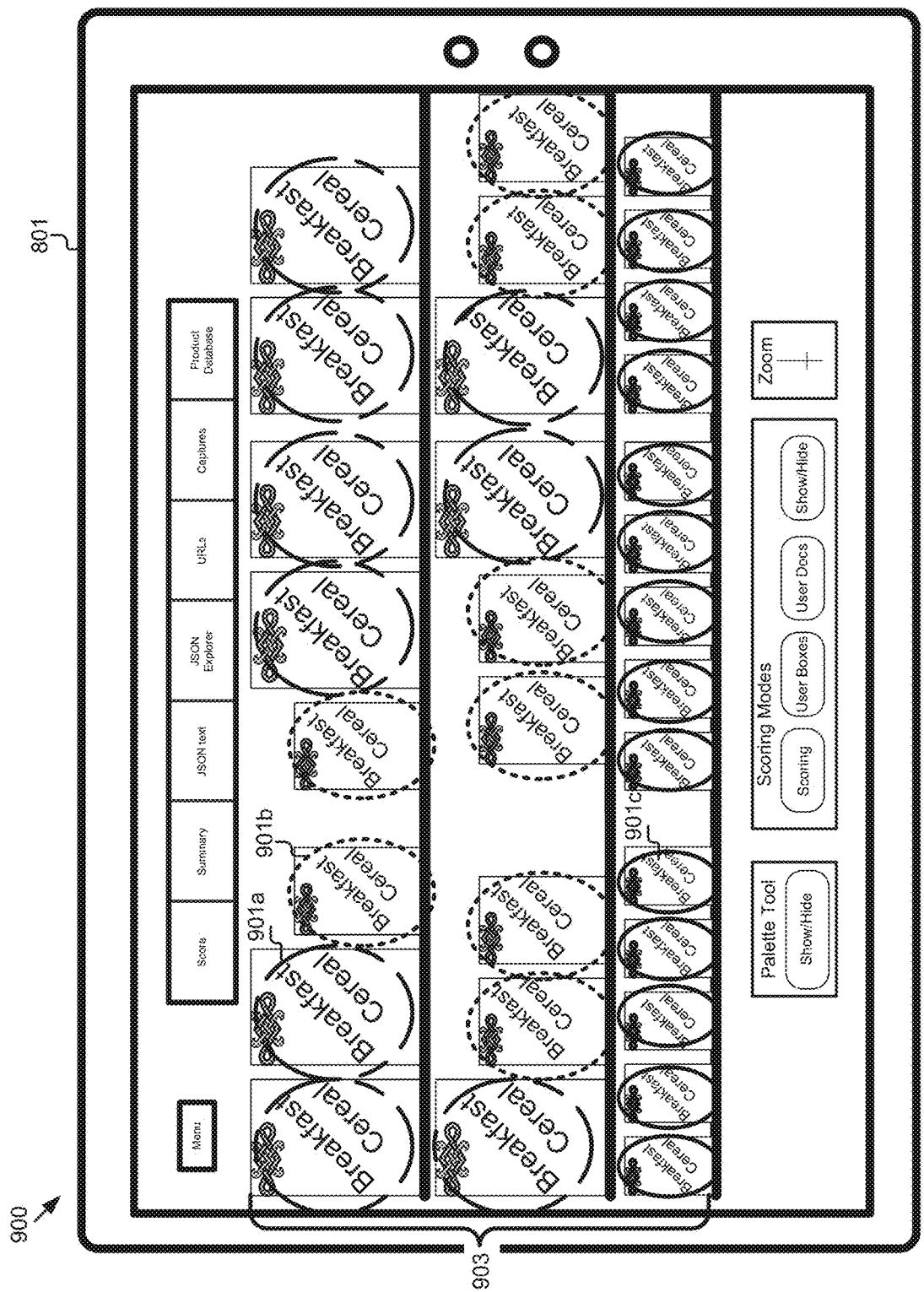
FIG. 9 is a graphical representation of another embodiment of the user interface displaying a visualization.

FIG. 9 is a graphical representation 900 of another embodiment of the user interface displaying a visualization. The display device 801 may display a stitched panoramic image 803 in the user interface. A visualization 903 may be overlaid or mapped over the stitched panoramic image 803 using image recognition information received from the analysis application 103. The visualization 903 may include product indicators 901a-901c to highlight recognized product images in the stitched panoramic image 803. The visualization 903 highlights products that the image recognition information from the processing module 203 determines to be the same product with a same product indicator 901. The product indicators 901a-901c may highlight different products with different shapes or patterns of product indicators. For examine, the product indicator 901a around a recognized product is a different pattern from the product indicators 901b and 901c around second and third respective recognized products. The visualization 903 highlights recognized product in the stitched panoramic image 803 based on image recognition information from the processing module 203. The product indicators may be any type of indicator, such as, a circle, square, rectangle or any other shape. Alternatively, in other embodiments, the product indicators may have varying patterns to indicate that product indicators are different. In other embodiments, the product indicator may be colors or highlighted regions that differ from other colors or highlighted regions. A user may be able to view the visualization 903 and based on the highlighted product indicators 901 determine which products are the same and different in a stitched panoramic image 803.

Figure 10:
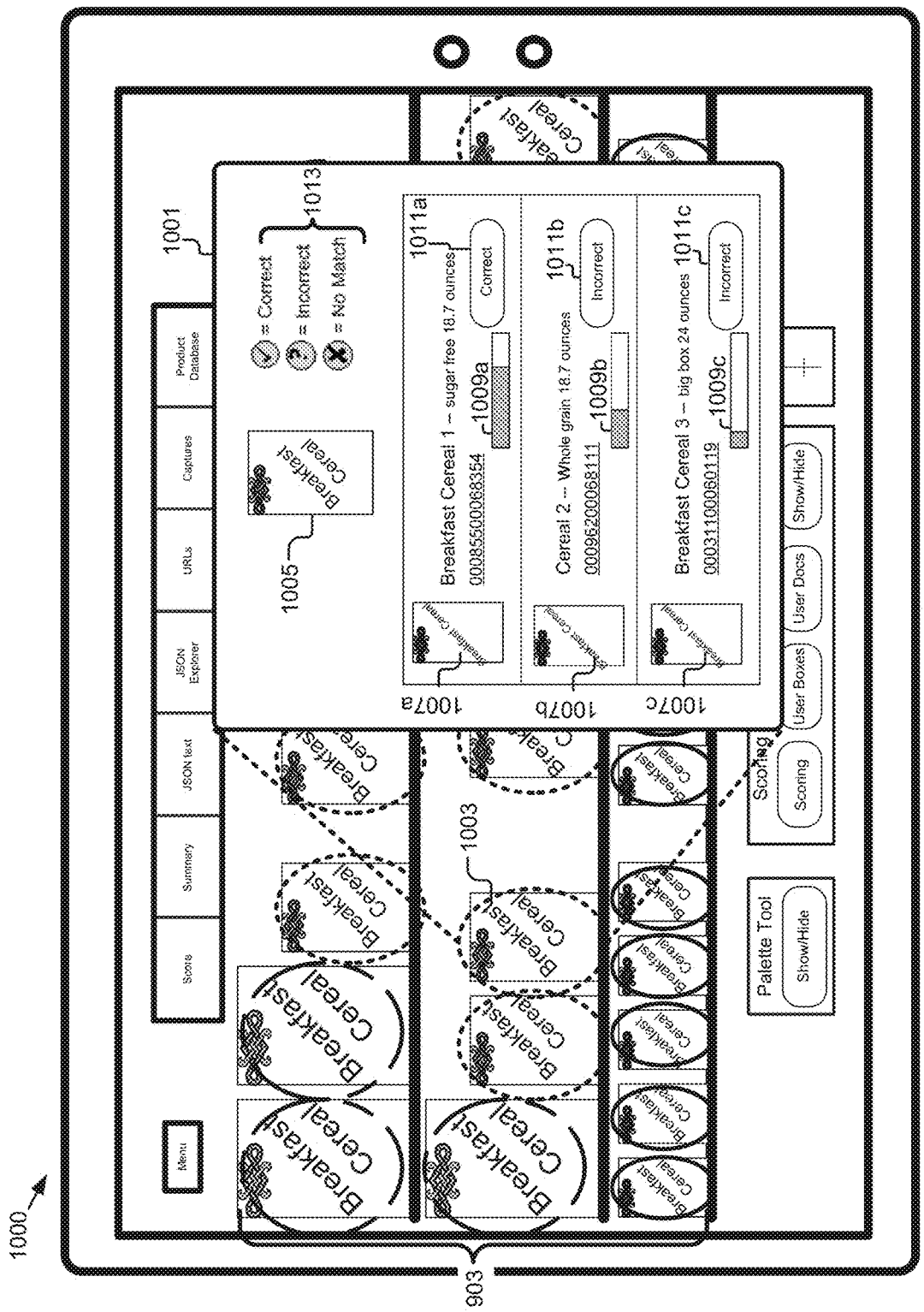
FIG. 10 is a graphical representation of yet another embodiment of the user interface displaying a visualization.

FIG. 10 is a graphical representation 1000 of another embodiment of the user interface displaying a visualization. The display device 801 may display a product recognition list 1001. The product recognition list 1001 may be displayed over a portion of the visualization 903 or the user interface may display the product recognition list 1001 in such a way that all of the visualization 903 is still visible in the same screen or different screens. A recognized product 1003 is highlighted by a product indicator in the visualization 903. The product indicator may be selectable by a user, such that in response to a user selecting the product indicator the product recognition list 1001 is displayed on the screen. For example, a user may select the product indicator around the recognized product 1003 and the product recognition list 1001 appears in the user interface display information based on the recognized product 1003. The product recognition list 1001 displays a recognized product image 1005. The recognized product image 1005 is an image of the recognized product 1003 displaying to the user which product is being displayed in the product recognition list 1001.

The product recognition list 1001 displays information about potential candidates 1007. The information about potential candidates 1007 is pulled from a product database. The product database includes product information and images of the products for use in image recognition. The product recognition list 1001 may access that information in real time to display potential candidates 1007 or in alternative embodiments, the potential candidates 1007 are included in the image recognition information received from the analysis application 103. The potential candidates 1007 are displayed in order based on a recognition score 1009. The recognition score may be generated by the analysis application 103 based on similarities between the recognized product image 1005 and images in the product database. In one example, the product recognition list 1001 displays the potential candidate 1007*a* at the top of the list of potential candidates 1007 based on the recognition score 1009*a* being the highest of the recognitions scores 1009. In some embodiments the recognition score 1009 is displayed as a percentage, or an icon of a percentage and in other embodiments the recognition score 1009 may display the actual score or another indicator to represent the recognized score 1009 to the user. The potential candidate 1007*a* at the top of the list of potential candidates 1007 may be labeled as the top candidate based on the recognized score 1009*a*.

In some embodiments, the product recognition list 1001 is displayed to a user for the user to determine if the recognized product image 1005 is the same as the top potential candidate 1007*a*. The product recognition list 1001 may include a correctness button 1011 along with each potential candidate 1007 for a user to select based on which potential candidates 1007 are the same as the recognized product image 1005. For example, a user may be able to select that a potential candidate 1007*a* is the same as the recognized product image 1005 by selecting a "correct" button as a type of correctness button 1011*a*. In another example, a user may be able to select an "incorrect" button as a type of correctness button 1011*b* when a potential candidate 1007*b* includes similarities to a recognized product image 1005. In another example a user may be able to select a "no match" button as a type of correctness button 1011 when the recognized product image 1005 has no similarities to a potential candidate 1007 or there are no similar potential candidates in the product database. Similarities that may be considered when determining a correctness include, but are not limited to, a same type of product, a same or similar manufacturer, a same similarity in packaging, etc. In some embodiments, the correctness button 1011 displays a suspected correctness button 1011 based on the recognition score 1009 and in other embodiments, a user picks from a list of correctness buttons 1011 the appropriate indicator.

A purpose of the product recognition list 1001 in these embodiments is to evaluate if the image recognition of the analysis application 103 was able to correctly identify or at least similarly identify a recognized product 1003 to a potential candidate 1007 from the product database. In some embodiments the information gathered from user interaction with the product recognition list 1001 may be used to update the product database. In some embodiments, in response to a user selecting a correctness button 1011, the user interface module 205 may display a correctness indicator 1013 matching the selected correctness button 1011 on the visualization 903 as will be further discussed in FIG. 11. In some embodiments, the user interface may display how many products a user has selected a correctness button 1011 for already and/or how many products have not yet had a user select a correctness button 1011.

Figure 11:
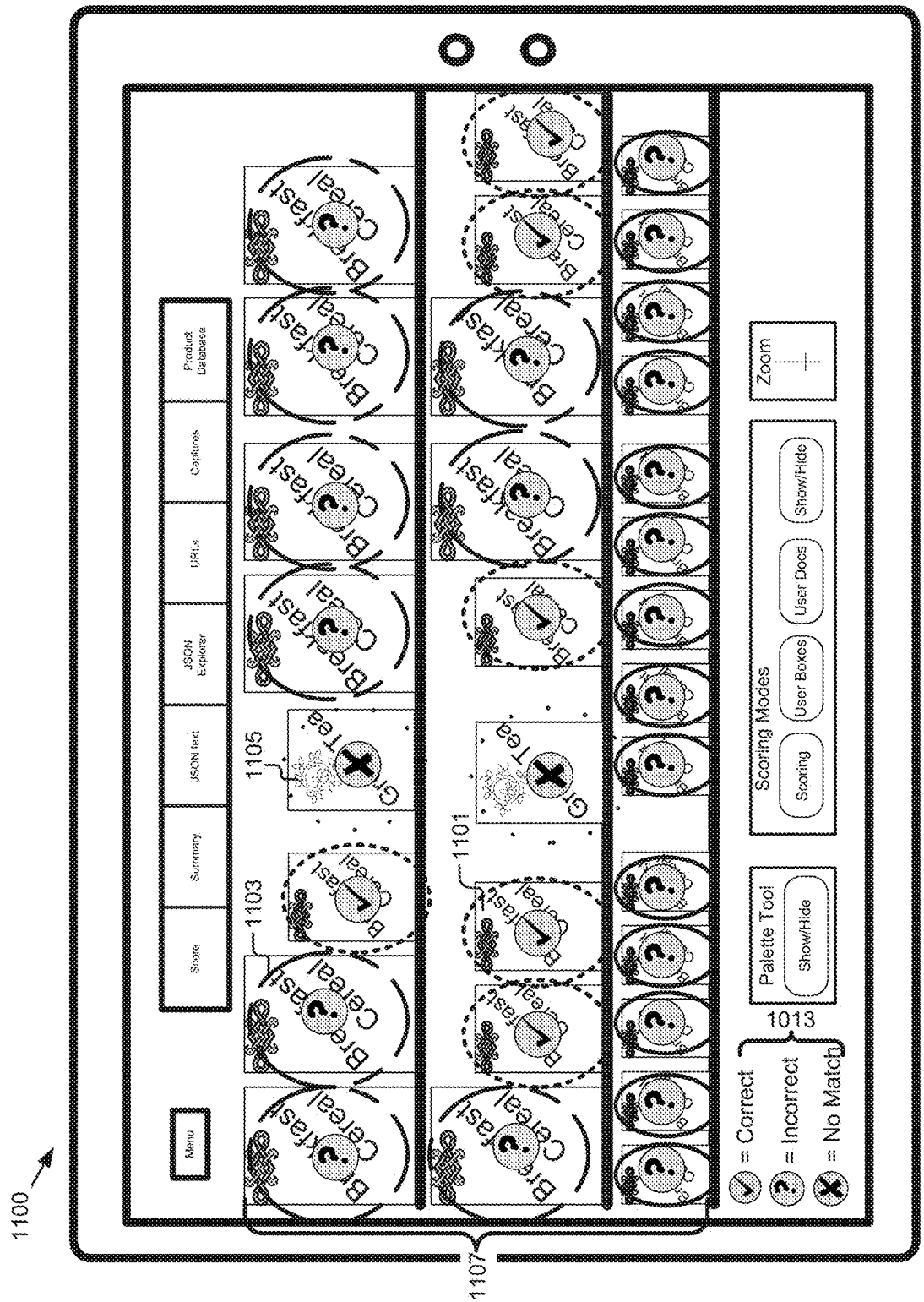
FIG. 11 is a graphical representation of yet another embodiment of the user interface displaying a visualization.

FIG. 11 is a graphical representation 1100 of another embodiment of the user interface displaying a visualization. An updated visualization 1107 may be displayed in the user interface. The updated visualization 1107 may include the stitched panoramic image 803, the visualization 903 including product indicators layered over the stitched panoramic image 803, and correctness indicators 1013 further layered over the stitched panoramic image 803. The correctness indicators 1013 may be displayed over each of the products in the stitched panoramic image 803 to convey information to a user about which products were recognized in the product database. The correctness indicators 1013 may be any image, icon, color or highlighting capable of conveying to a user a correctness of a product. The recognition of the products in some embodiments may be based on a top candidate and highest recognition score, while in alternative embodiments the recognition of the products may be performed by a user selecting a correctness button 1011 in a product recognition list 1001. In an example, a correctly identified product 1101 displays a "correct" correctness indicator 1013, an incorrectly identified product 1103 displays an "incorrect" correctness indicator 1013, and a no match identified product 1105 displays a "no match" correctness indicator 1013. In this example the updated visualization 1107 may be able to display correctness indicators 1013 over products in the updated visualization 1107. The updated visualization 1107 allows a user to analyze the image recognition information in a visual manner. By analyzing the updated visualization 1107 a user or a computer may recognize errors and/or trends in recognition in some embodiments and in other embodiments, a user or computer may recognize where the image of the shelf deviates from a planogram.

Figure 12A:
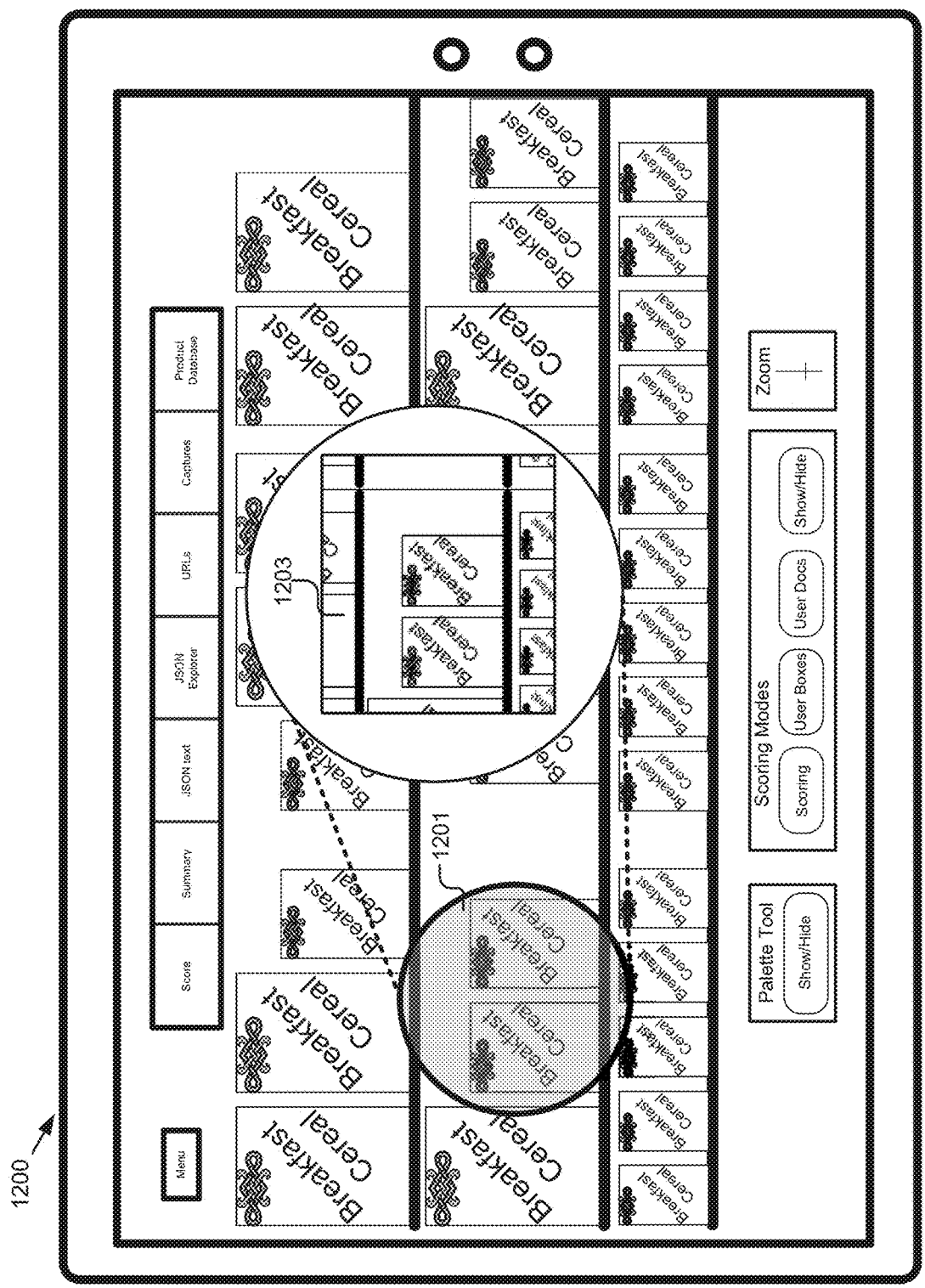
FIGS. 12A-12C are graphical representations of further embodiments of user interfaces displaying visualizations.

FIG. 12A is a graphical representation 1200 of a further embodiment of a user interface displaying a visualization. In an example, a portion of a shelf 1201 displaying recognized products is shown. A perspective view 1203 of the portion of the shelf 1201 is displayed for a user to more clearly see what is present in the portion of the shelf 1201. In one example, in a planogram for the shelves displayed in the user interface, the portion of the shelf 1201 is displaying a correct product in the portion of the shelf 1201.

Figure 12B:
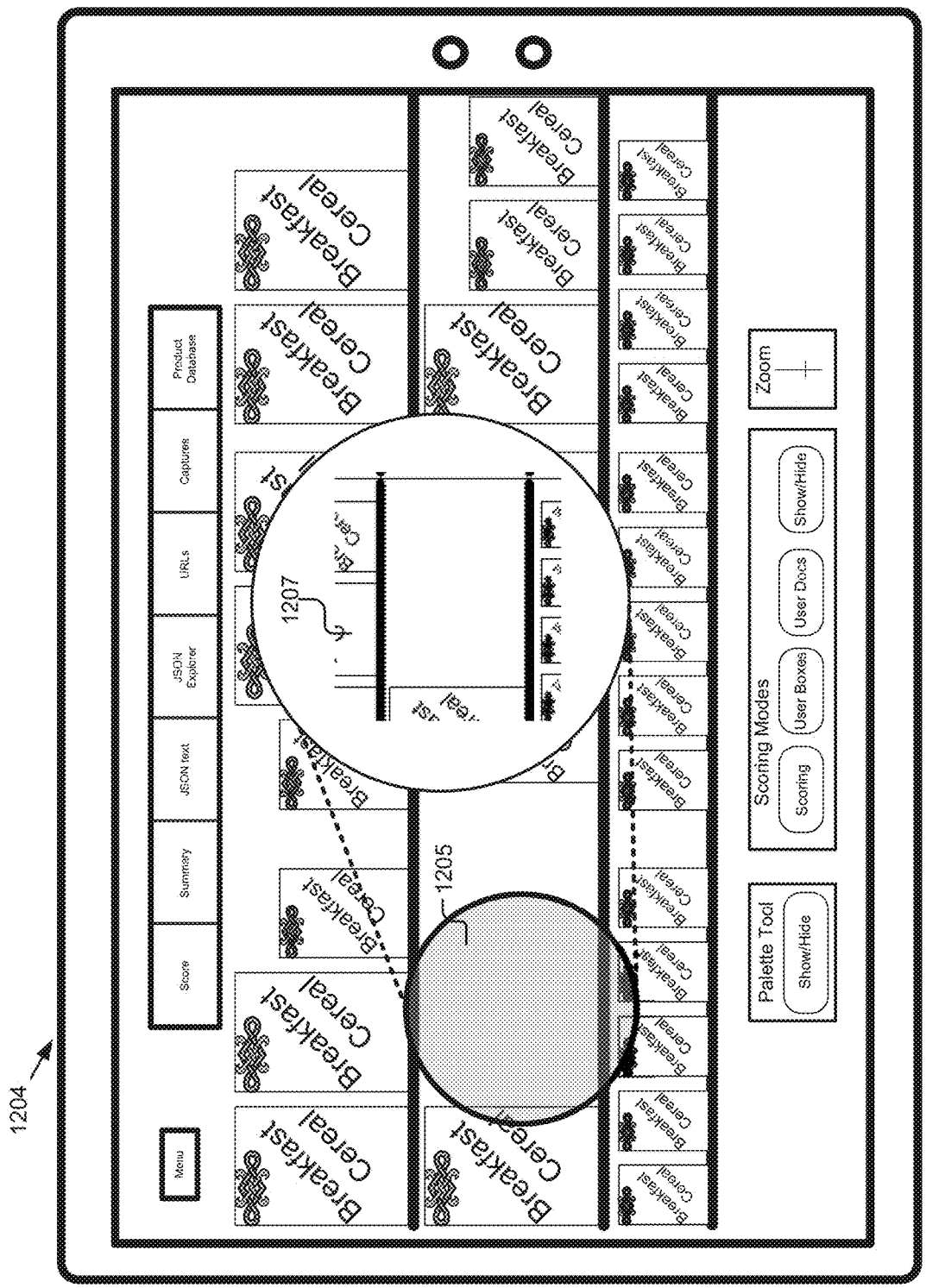

FIG. 12B is a graphical representation 1204 of a further embodiment of a user interface displaying a visualization. In an example, an empty portion of a shelf 1205 is shown displaying an absence of a product that was present in the portion of the shelf 1201. A perspective view 1207 of the empty portion of the shelf 1205 is displayed for a user to see that a product is absent in the empty portion of the shelf 1205. A user may compare the visualization on 1204 to the visualization in 1200 displaying a correct product in the portion of the shelf 1201 to determine what product is missing from the empty portion of the shelf 1205. This is an example of how using a visualization, a user or computer can determine an out of stock product more quickly than simply consulting the planogram. In some embodiments a computer may compare the two visualizations and determine where a difference between a first visualization 1200 such as the correct product in the portion of the shelf 1201 deviates from a second visualization 1204 where a product is out of stock or missing as shown by the empty portion of the shelf 1205.

Figure 12C:
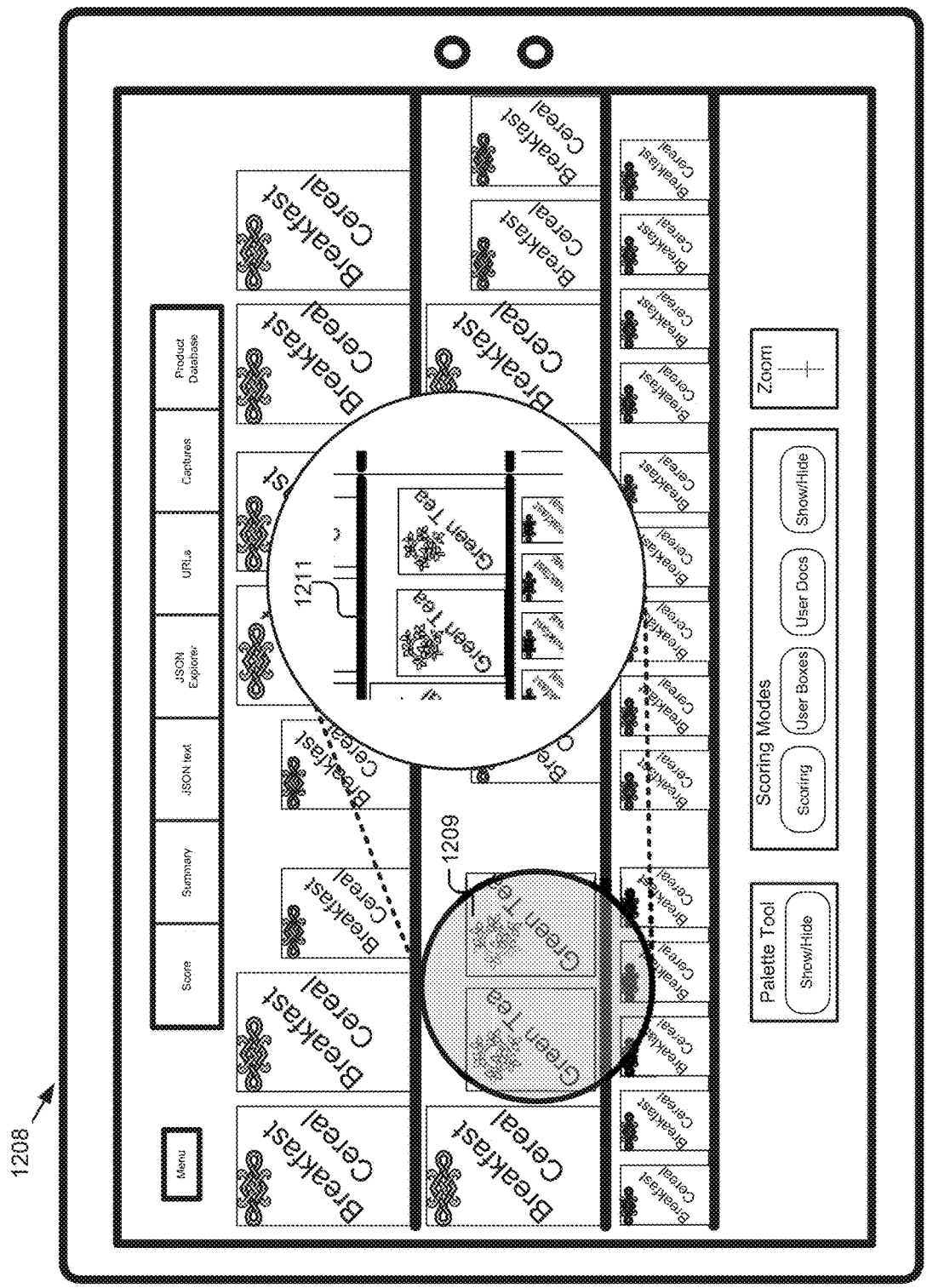

FIG. 12C is a graphical representation 1208 of a further embodiment of a user interface displaying a visualization. In an example, a wrong product is displayed in a portion of the shelf 1209. A perspective view 1211 of the wrong product in the portion of the shelf 1209 is displayed for a user to see displayed the wrong product in the portion of the shelf 1209. A user may compare the visualization on 1208 to the visualization in 1200 displaying a correct product in the portion of the shelf 1201 to determine what product is the wrong product in the portion of the shelf 1209. This is an example of a "hidden out of stock" product, where in a planogram a certain product should appear in a certain portion of shelf, but a different product may be placed in that portion of the shelf. In some examples, a "hidden out of stock" product may be even more difficult to detect when a price tag is also removed from a shelf and there is no indication on the shelf of what product is actually supposed to be placed in that portion of the shelf. However, in some embodiments a computer may compare the two visualizations and determine where a difference between a first visualization 1200 such as the correct product in the portion of the shelf 1201 deviates from a second visualization 1208 where a wrong product is placed on a shelf as shown by the wrong product in the portion of the shelf 1209.

In some embodiments, the user interface may display a visualization that highlights a portion of the panoramic image that includes more than a single recognized product. The highlighted portion in this embodiment is based on recognized products within the highlighted portion sharing characteristics. In some examples, characteristics that may be shared include products being produced by the same manufacturer, products representing a same type of product, or products having similar size and/or shape of packaging. In one embodiment, the image recognition information received from the processing module 203 may include UPC (Universal Product Code) information. The processing module 203 may analyze the UPC information of each recognized product and based on the UPC of each recognized product, highlight portions of the panoramic image sharing a similar UPC. The UPC may be similar if the products share a common manufacture, allowing a user to view where products are placed on a shelf by a manufacturer.

In some embodiments, the user interface module 205 may display a user interface that may include a visualization that highlights recognized products, such as the visualization shown in FIG. 9. The user interface may then remove portions of the stitched panoramic image 903 that do not include highlighted recognized products. In such an embodiment, the user would be left with only recognized products, making determination of mistakes easier, as well as removing unnecessary data for further image processing.

In some embodiments, the user interface may display two visualizations in a single user interface. Such an embodiment allows a user to compare a first visualization to a second visualization and determine differences between the two visualizations. The visualizations may be different visualizations in a series of images related to a single job or in alternative embodiments, the visualizations may be from separate jobs. In yet another embodiment, the user interface may allow the two visualizations to be displayed in the same area. A user can toggle between the two visualizations, allowing them to alternatively be displayed in the same region of a user interface. In some embodiments, the user interface may provide an option for animating the two visualizations such that the user interface toggles between the first visualization and the second visualization automatically, allowing a user to compare the two visualizations and highlight differences between the visualizations as they separately appear and disappear in the user interface.

Figure 13:
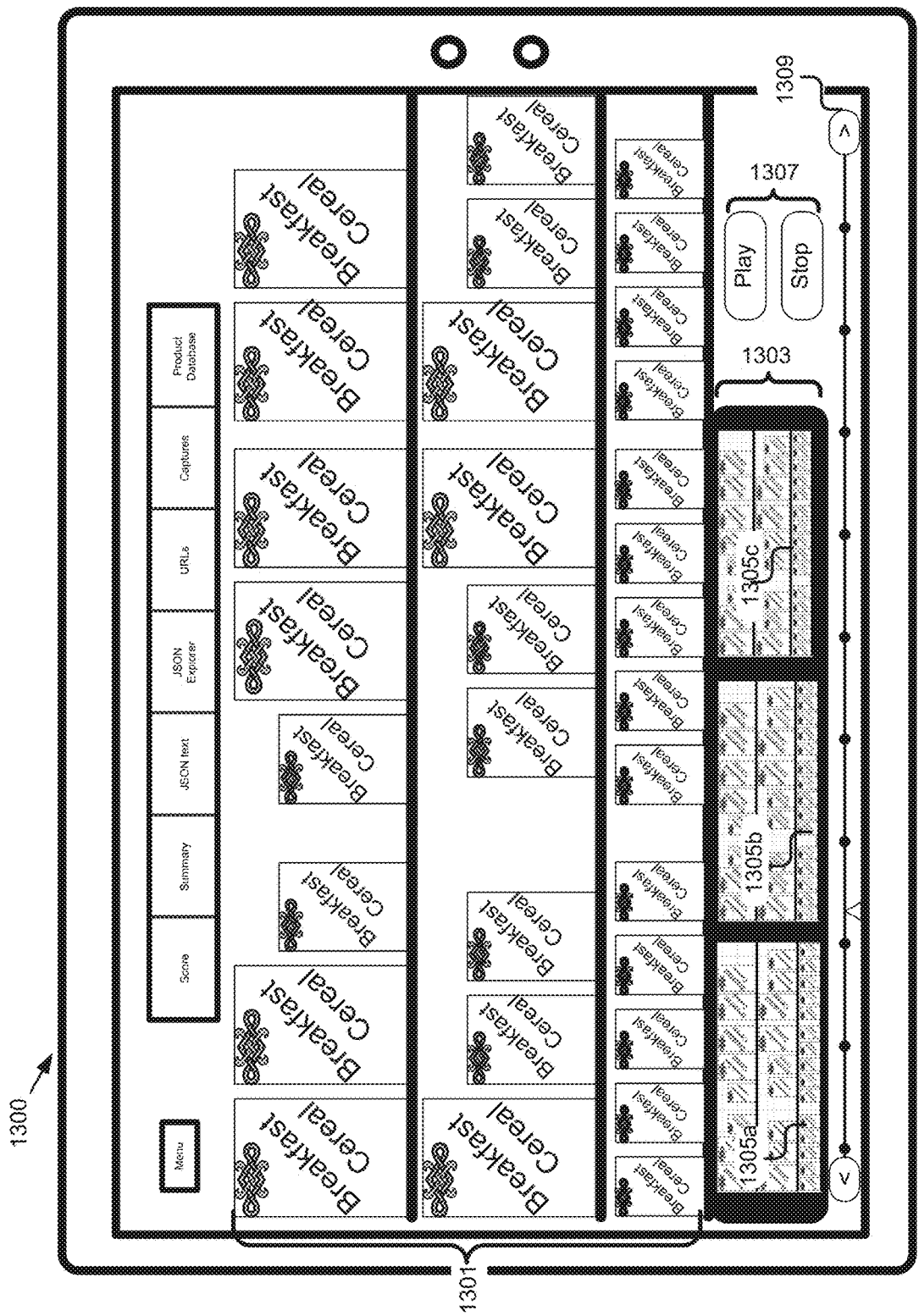
FIG. 13 is a graphical representation of an embodiment of a user interface displaying a visualization in a timeline.

FIG. 13 is a graphical representation 1300 of an embodiment of a user interface displaying a visualization in a timeline. A current visualization 1301 is displayed of a series of shelf images stitched together into a panoramic image. The images used to create the visualization 1301 were captured at a specific time and the images used to create a specific visualization are linked to a token representing a job. Other images of the shelf captured at different times than the displayed image may be used to create separate visualizations of separate jobs of the shelf at different times, each of the separate jobs represented by a different token. A preview pane 1303 may display thumbnails 1305 of other images or visualizations in the job captured at different times than the current visualization 1301. A video tool 1307 may be provided that allows the current visualization 1301 and the other thumbnails 1305 to be displayed in an animated format as a video over time. In one example, a user may select "play" in the video tool 1307 and the current visualization 1301 will be replaced with the second visualization based on thumbnail 1305a in the job and the second visualization will be displayed for a period of time in the user interface. In response to a period of time expiring, the third visualization based on thumbnail 1305b in the job will replace the second visualization in the user interface and the third visualization will be displayed in the user interface for a period of time. In one example, the visualizations may be displayed in a video-like format until a user selects "stop" on the video tool 1307. A timeline 1309 of the job may also be displayed in the user interface. The timeline 1309 may include an indicator showing where the current visualization 1301 appears in the time period of when pictures of the job were captured. A user may interact with the timeline 1309 and move forward or back through series of images of the job captured over time to analyze changes in the visualizations 1305 over the time period.

Figure 14:
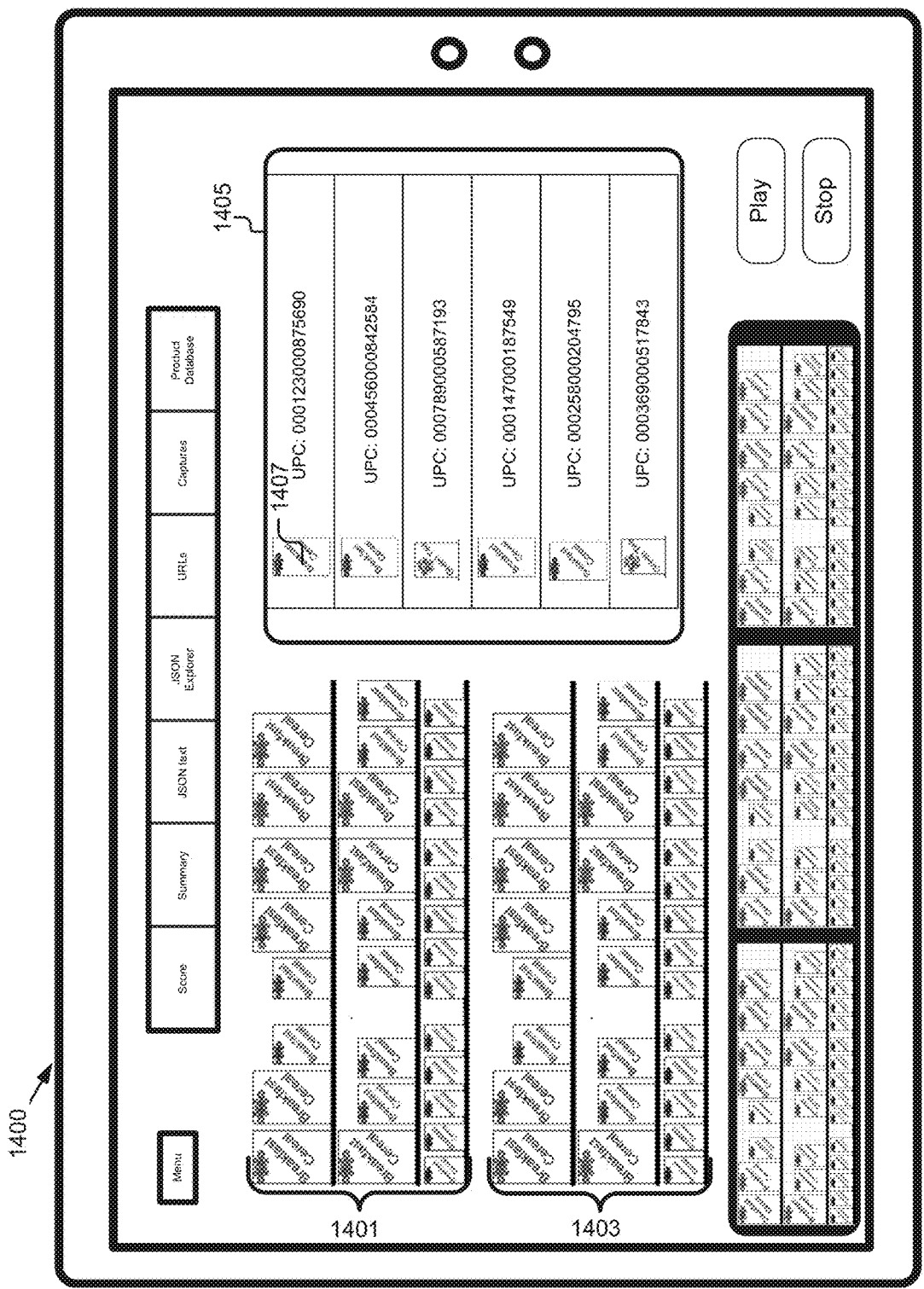
FIG. 14 is a graphical representation of another embodiment of the user interface displaying a visualization in a timeline.

FIG. 14 is a graphical representation 1400 of another embodiment of a user interface displaying a visualization in a timeline. A visualization 1401 and a visualization 1403 may be displayed concurrently in a user interface. The visualization 1401 and the visualization 1403 may be visualizations from the same job but captured at different times over a period of time. In an alternative embodiment, the visualization 1401 may be related to a first job and the visualization 1403 may be related to a second job. By displaying both the visualization 1401 and the visualization 1403 concurrently in the user interface, a user may be able to compare the visualizations and identify differences between the visualization 1401 and the visualization 1403.

In some embodiments, a product recognition pane 1405 may be displayed in the user interface. The product recognition pane 1405 may display a list of recognized products present in visualization 1401 or visualization 1403. The list of recognized products may be pulled from a product database. The list may be generated when the visualization 1401 and visualization 1403 are displayed or in alternative embodiments, the list of recognized products may be generated by the processing module 203 and included in the image recognition information as part of the job. A recognized product 1407 in the list of recognized products may include an image of the product from the product database, a UPC assigned to the recognized product, and any other relevant product information from the product database.

Figure 15A:
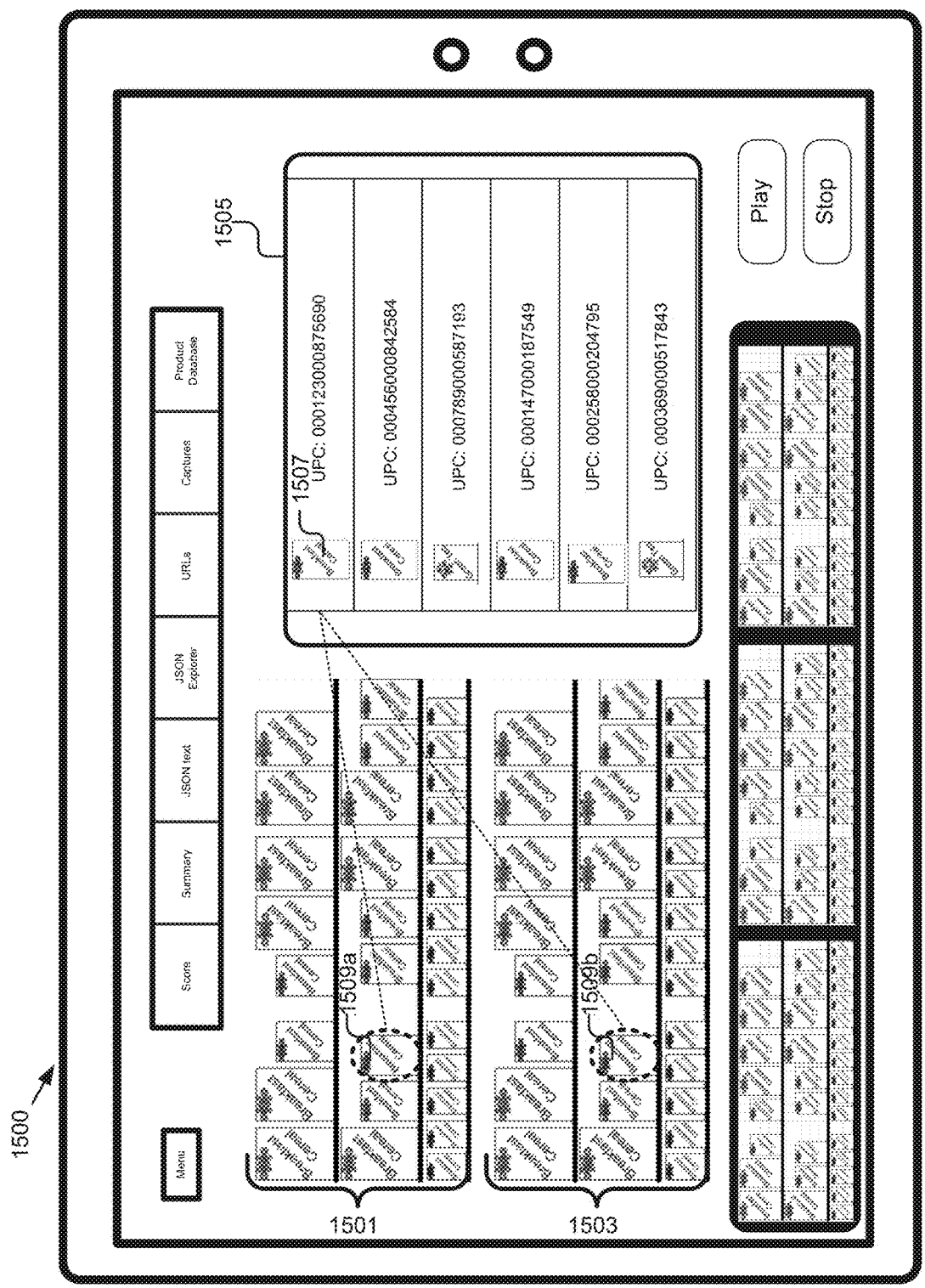
FIGS. 15A-15C are graphical representations of further embodiments of user interfaces displaying visualizations in timelines.

FIG. 15A is a graphical representation 1500 of an embodiment of the user interface displaying visualizations in a timeline. A recognized product 1507 may be selectable by a user from a product recognition pane 1505. In response to a user selecting the recognized product 1507, the visualization 1501 and the visualization 1503 will display where in the respective stitched panoramic images the recognized product 1507 appears. In the example in FIG. 15A, the recognized product 1507 appears in both visualizations. The visualization 1501 and the visualization 1503 will update to highlight the recognized product 1507 by displaying a product indicator 1509 over the recognized product 1507 in the visualizations. The product indicator 1509 highlights where in the visualization 1501 and visualization 1503 the recognized product 1507 appears. A user may be able to click on a product from the product recognition pane 1505 and determine if the both displayed visualizations in the job display the selected product. Using this feature, a user can quickly determine when visualizations are compliant with a planogram and may highlight similarities between two visualizations that may be difficult to recognize without the product indicators 1509 overlaid on the visualizations.

Figure 15B:
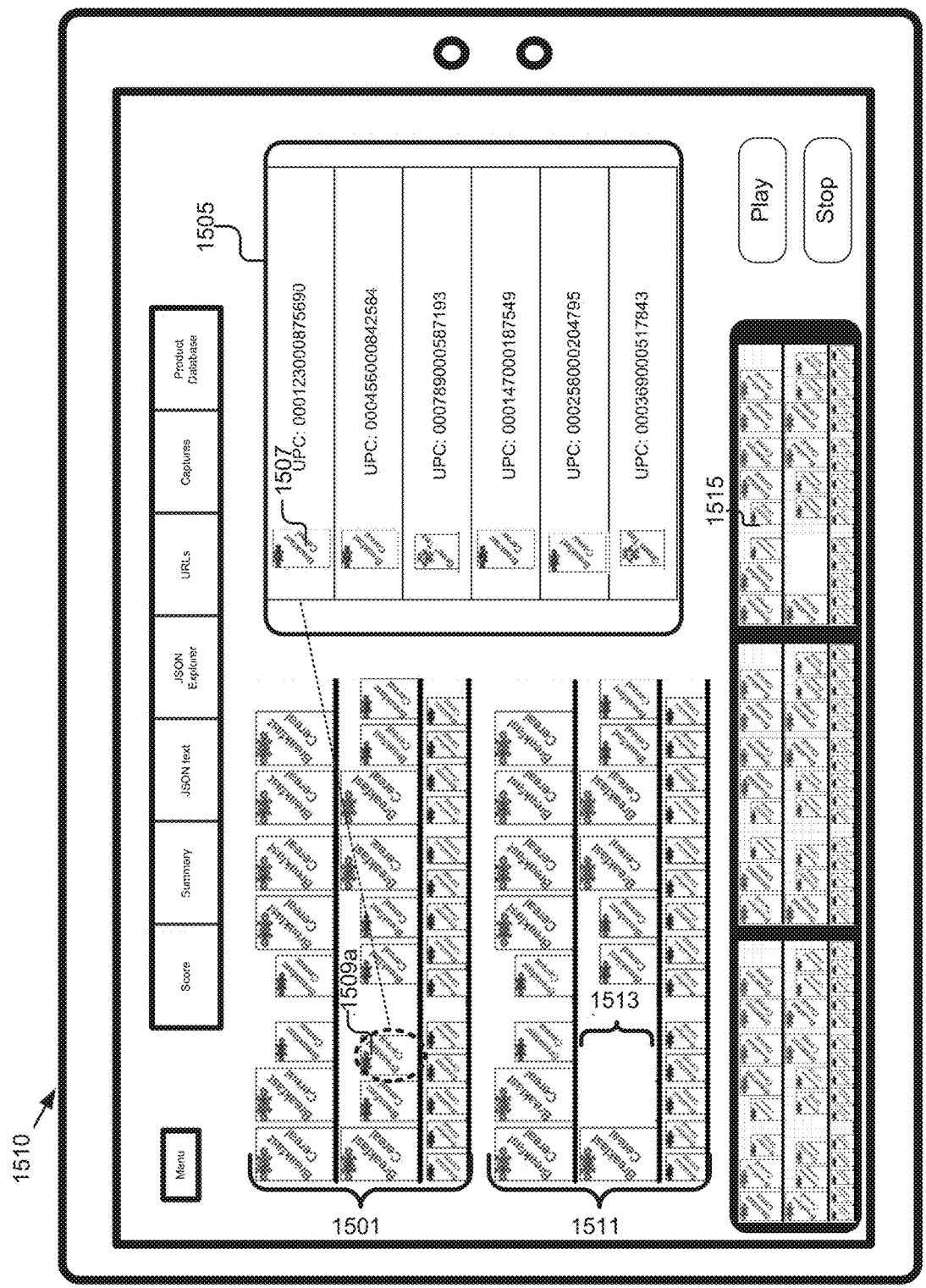

FIG. 15B is a graphical representation 1510 of another embodiment of the user interface displaying visualizations in a timeline. In this embodiment, a recognized product 1507 is selected by a user and highlighted by a product indicator 1509a in the visualization 1501. However, visualization 1511 does not include the recognized product 1507. An empty shelf area 1513 is present where the recognized product 1507 appears in visualization 1501. In an example where recognized product 1507 may be out of stock at the time the images used to create visualization 1511 were captured. The user interface face displays a preview image 1515 of another instance of time in the job where the same recognized product 1507 was absent from the captured images. By selecting the recognized product 1507 from the product recognition pane 1505, a user is quickly able to observe that the empty shelf area 1513 is present in the visualization 1511 where recognized product 1507 should appear. The user interface in this example provides a user with a feature that assists in determining compliance with a planogram. A user observing the shelf or an image of the shelf without the visualizations may not recognize that a product is out of stock, especially when an item is small and the space on the shelf the product occupies may be difficult to observe.

Figure 15C:
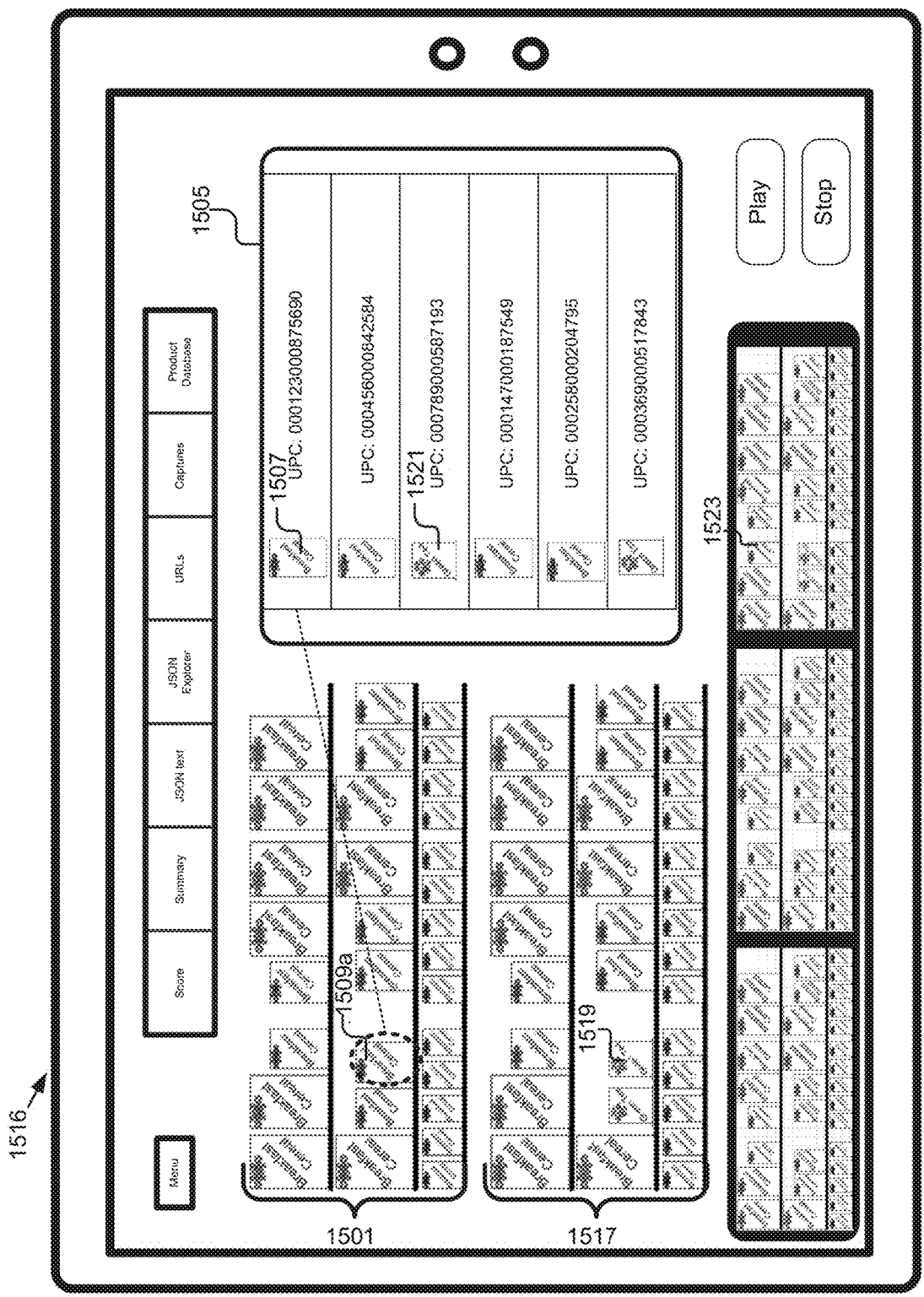

FIG. 15C is a graphical representation 1516 of another embodiment of the user interface displaying visualizations in a timeline. In this embodiment, a recognized product 1507 is selected by a user and highlighted by a product indicator 1509a in the visualization 1501. However, visualization 1517 does not include the recognized product 1507. A different product 1519 is present in visualization 1517 where the recognized product 1507 appears in the visualization 1501. In an example where the recognized product 1507 was replaced by the different product 1519 on the shelf at a different time when the images used to create visualization 1517 were captured. The user interface displays a preview image 1523 of another instance of time in the job where the same recognized product 1507 was replaced by the different product 1519 in a captured image. By selecting the recognized product 1507 from the product recognition pane 1505, a user is quickly able to observe that the visualization 1501 and the visualization 1517 are different and that the different product 1519 appears where a recognized product 1507 should be based on the visualization 1501. The product recognition pane 1505 in this example also includes the different product 1521 in the list of products found in the visualization 1501 and visualization 1517. A user may be able to select the different product 1521 in the product recognition pane 1505 and the visualization 1517 would update by highlighting the different product 1519 with a product indicator. The user interface in this example provides a user with a feature that assists in determining compliance with a planogram. A user observing the shelf or an image of the shelf without the visualizations would have a difficult time recognizing that the images of the shelf displayed in visualization 1517 include an error. In some instances a wrong product may be even more difficult to detect where the price tag or label is also absent from the shelf. If the price tag or label is missing, there would be no indication to a user stocking the shelf or manually observing the shelf or images of the shelf that a product is placed incorrectly or that a recognized product is out of stock. The visualizations in the timeline allow a user to compare different visualizations of shelf over a period of time and easily observe and highlight differences in the products present on the shelf over time.

The data gathered while presenting these visualizations may also be used to identify trends in product sales over time. The visualizations in the timeline may allow a user to observe areas where products sell more quickly and areas of the shelf where products are purchased less frequently based on the visualizations. The visualizations may also allow a user to determine where errors in stocking and product placement are introduced and avoid making the same errors.

Figure 16:
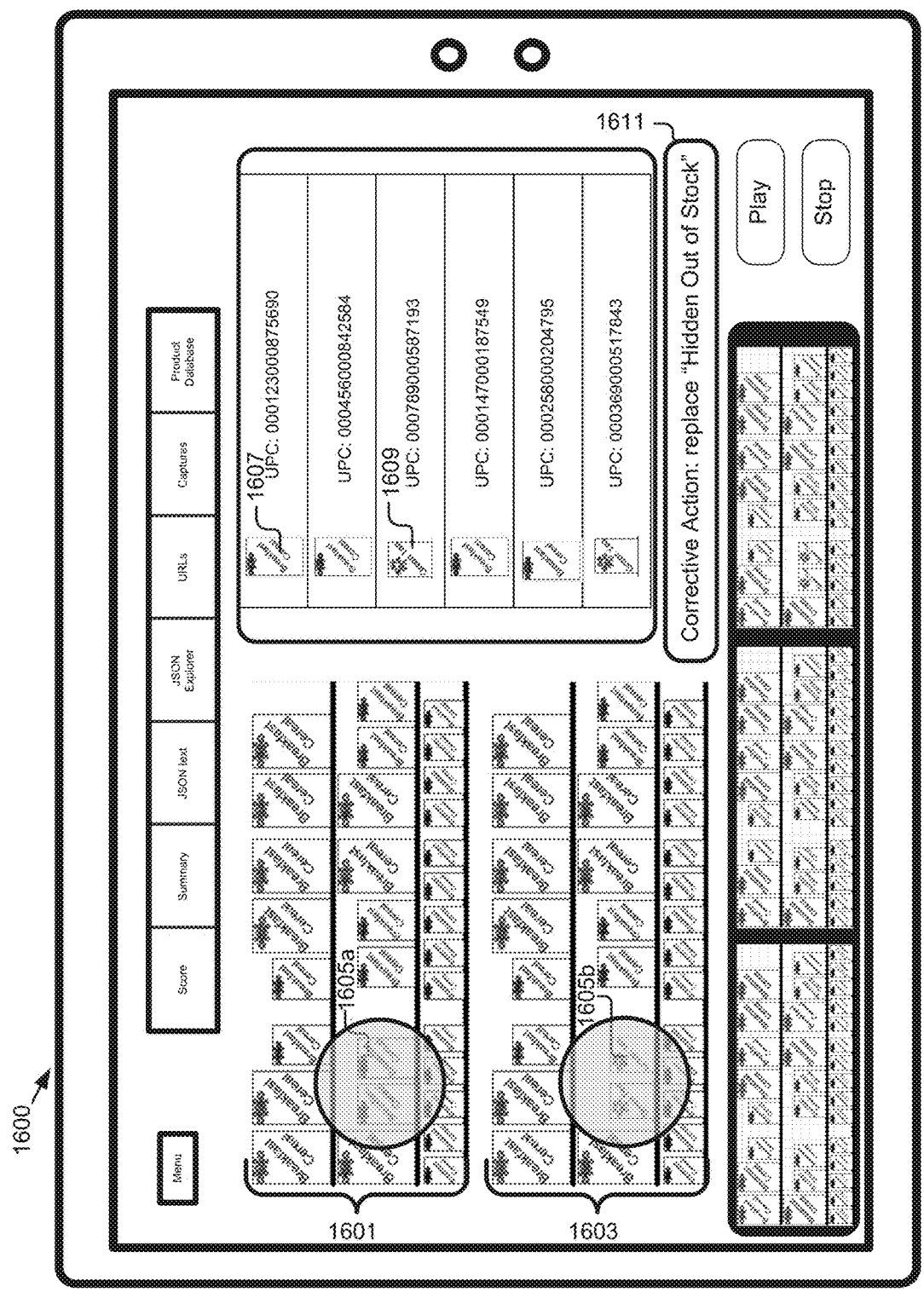
FIG. 16 is a graphical representation of another embodiment of the user interface displaying visualizations in timelines.

FIG. 16, is a graphical user interface 1600 of another embodiment of the user interface displaying visualizations in a timeline. In this embodiment, a visualization 1601 representing a first job and a visualization 1603 representing a second job are displayed. The user interface module 205 compares the visualization 1601 with the visualization 1603 and determines if there are differences between the visualizations. Differences in the visualizations are highlighted by a difference indicator 1605a on the visualization 1601 and a difference indicator 1605b on the visualization 1603. In some embodiments, the user interface module 205 may further display the difference indicator 1605 and a corrective action 1611. For example, the difference indicator 1605b displays a region of the shelf of visualization 1603 that shows a "hidden out of stock" product. The difference indicator 1605a displays a correctly stocked product in the visualization 1601 and the difference indicator 1605b shows a different product displayed where the correct product should have been placed on the shelf (e.g., giving rise to a "hidden out of stock"). A product recognition pane may be displayed to show products recognized in visualization 1601 and 1603. The recognized product 1607 may correlate to the product displayed in the difference indicator 1605a. The recognized product 1609 may correlate the product displayed in the difference indicator 1605b. A user may be able to select the recognized product 1607 or the recognized product 1609 and access a product database. By accessing the product database, a user may be able to determine if the corrective action provided by the user interface module 205 is appropriate.

In another embodiment, the user interface module 205 may highlight a region of a first visualization and a corresponding region of a planogram. The user interface module 205 may determine that the region of the first visualization displays a product and that the corresponding region of the planogram does not display a corresponding product. In such an instance, the user interface module 205 may provide a corrective instruction based on the planogram. For example, a shelf may display a correct product in a correct location in the planogram and in the first visualization a wrong product may be displayed in that same shelf area. The corrective instruction the user interface module 205 may provide would be to remove the wrong product and replace it with the correct product. Corrective instructions may also include restocking a shelf region when a correct product is determined to be out of stock based on the second visualization displaying an empty shelf. Using these corrective instructions a user may quickly determine planogram compliance and correct any stocking errors.

A system and method for image recognition result visualization has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving a request to view a job in a graphical user interface;
    requesting, using one or more processors, the job by sending a token related to the job to a server storing data associated with the job via a network;
    receiving, using the one or more processors, the job related to the token, wherein the job includes a panoramic image and metadata;
    processing, using the one or more processors, the metadata to extract image recognition information, the image recognition information comprising features of a plurality of objects depicted within the panoramic image;
    creating, using the one or more processors, a visualization of the job, wherein the visualization includes the panoramic image with the image recognition information overlaid on the panoramic image to highlight an object of the plurality of objects;
    determining, using the one or more processors, an identity of the object of the plurality of objects depicted within the panoramic image by matching the features of the object of the plurality of objects with a potential candidate in a product database that has a highest recognition score;
    determining, using the one or more processors, a correctness of the determined identity of the object of the plurality of objects based on the matching;
    updating, using the one or more processors, the visualization of the job by removing portions of the visualization that do not include the plurality of objects; and
    displaying in the graphical user interface, the updated visualization of the job and a correctness indicator signaling the correctness of the object of the plurality of objects.

2. The method of claim 1 wherein the object of the plurality of objects is a recognized product and creating the visualization of the job further comprises:
    highlighting, using the one or more processors, the recognized product in the panoramic image using the image recognition information; and
    displaying, using the one or more processors, a product recognition list in response to a user selecting the recognized product.

3. The method of claim 2, comprising, creating the product recognition list by:
    extracting, using the one or more processors, a listing of potential candidates that share similar features with the recognized product from the image recognition information; and
    displaying, using the one or more processors, the listing of potential candidates.

4. The method of claim 2, wherein an entry in the product recognition list includes a recognition score for a corresponding potential candidate, the recognition score indicating similarity of a feature shared between the recognized product and the corresponding potential candidate.

5. The method of claim 2, wherein the correctness indicator further comprises:
    a correct visual indicator in the visualization proximate to the object of the plurality of objects responsive to determining that the identity of the object of the plurality of objects is correctly identified; or
    an incorrect visual indicator in the visualization proximate to the object of the plurality of objects responsive to determining that the identity of the object of the plurality of objects is incorrectly identified.

6. The method of claim 1, wherein the plurality of objects are recognized products, the method further comprising:
    highlighting, using the one or more processors, a portion of the panoramic image based on the recognized products sharing a characteristic.

7. The method of claim 1, wherein the plurality of objects are recognized products, the method further comprising:
    displaying, using the one or more processors, a boundary around the recognized products in the panoramic image.

8. The method of claim 1, wherein the visualization is a first visualization of a first job, the method further comprising:
    creating, using the one or more processors, a second visualization of a second job;
    comparing, using the one or more processors, the first visualization with the second visualization in a single display screen of a user interface; and
    highlighting, using the one or more processors, differences between the first visualization and the second visualization.

9. The method of claim 8, wherein comparing the first visualization with the second visualization further comprises displaying the first visualization and the second visualization in an animation, wherein the animation toggles between the first visualization and the second visualization.

10. A non-transitory computer program product comprising a computer usable medium including a computer readable program, wherein the computer readable program when executed on a computer causes the computer to:
    receive, using one or more processors, a request to view a job in a graphical user interface;
    request, using the one or more processors, the job by sending a token related to the job to a server storing data associated with the job via a network;
    receive, using the one or more processors, the job related to the token, wherein the job includes a panoramic image and metadata;
    process, using the one or more processors, the metadata to extract image recognition information, the image recognition information comprising features of a plurality of objects depicted within the panoramic image;
    create, using the one or more processors, a visualization of the job, wherein the visualization includes the panoramic image with the image recognition information overlaid on the panoramic image to highlight an object of the plurality of objects;
    determine, using the one or more processors, an identity of the object of the plurality of objects depicted within the panoramic image by matching the features of the object of the plurality of objects with a potential candidate in a product database that has a highest recognition score;
    determine a correctness of the determined identity of the object of the plurality of objects based on the matching;
    update, using the one or more processors, the visualization of the job by removing portions of the visualization that do not include the plurality of objects; and
    display in the graphical user interface, the updated visualization of the job and a correctness indicator signaling the correctness of the object of the plurality of objects.

11. The non-transitory computer program product of claim 10 wherein the object of the plurality of objects is a recognized product and the computer readable program causing the computer to create the visualization further causes the computer to:
    highlight, using the one or more processors, the recognized product in the panoramic image using the image recognition information; and
    display, using the one or more processors, a product recognition list in response to a user selecting the recognized product.

12. The non-transitory computer program product of claim 11, wherein the computer readable program when executed on a computer further causes the computer to create the product recognition list to:
    extract, using the one or more processors, a listing of potential candidates that share similar features with the recognized product from the image recognition information; and
    display, using the one or more processors, the listing of potential candidates.

13. The non-transitory computer program product of claim 11, wherein the correctness indicator further comprises:
    a correct visual indicator displayed in the visualization proximate to the object of the plurality of objects responsive to determining that the identity of the object of the plurality of objects is correctly identified; or
    an incorrect visual indicator displayed in the visualization proximate to the object of the plurality of objects responsive to determining that the identity of the object of the plurality of objects is incorrectly identified.

14. The non-transitory computer program product of claim 10, wherein the visualization is a first visualization of a first job, wherein the computer readable program when executed on a computer further causes the computer to:
    creating, using the one or more processors, a second visualization of a second job;
    compare, using the one or more processors, the first visualization with the second visualization in a single display screen of a user interface; and
    highlight, using the one or more processors, differences between the first visualization and the second visualization.

15. A system comprising:
    one or more processors; and
    a memory storing instructions that, when executed by the one or more processors, cause the system to:
        receive a request to view a job in a graphical user interface;
        request the job by sending a token related to the job to a server storing data associated with the job via a network;
        receive the job related to the token, wherein the job includes a panoramic image and metadata;
        process the metadata to extract image recognition information, the image recognition information comprising features of a plurality of objects depicted within the panoramic image;
        create a visualization of the job, wherein the visualization includes the panoramic image with the image recognition information overlaid on the panoramic image to highlight an object of the plurality of objects;
        determine an identity of the object of the plurality of objects depicted within the panoramic image by matching the features of the object of the plurality of objects with a potential candidate in a product database that has a highest recommendation score;
        determine a correctness of the determined identity of the object of the plurality of objects based on the matching;
        update the visualization of the job by removing portions of the visualization that do not include the plurality of objects; and
        display, in the graphical user interface, the updated visualization of the job and a correctness indicator signaling the correctness of the object of the plurality of objects.

16. The system of claim 15 wherein the object of the plurality of objects is a recognized product and wherein to create the visualization of the job, the instructions cause the system to:
    highlight the recognized product in the panoramic image using the image recognition information; and
    display a product recognition list in response to a user selecting the recognized product.

17. The system of claim 16, wherein to create the product recognition list, the instructions cause the system to:
    extract a listing of potential candidates that share similar features with the recognized product from the image recognition information; and
    display the listing of potential candidates.

18. The system of claim 16, wherein an entry in the product recognition list includes a recognition score for a corresponding potential candidate, the recognition score indicating similarity of a feature shared between the recognized product and the corresponding potential candidate.

19. The system of claim 15, wherein the correctness indicator comprises:
- a correct visual indicator displayed in the visualization proximate to the object of the plurality of objects responsive to determining that the identity of the object of the plurality of objects is correctly identified; or
- an incorrect visual indicator displayed in the visualization proximate to the object of the plurality of objects responsive to determining that the identity of the object of the plurality of objects is incorrectly identified.

20. The system of claim 15, wherein the visualization is a first visualization of a first job, and the instructions cause the system to:
- create a second visualization of a second job;
- compare the first visualization with the second visualization in a single display screen of a user interface; and
- highlight differences between the first visualization and the second visualization.

\* \* \* \* \*